United States Patent
Sabella et al.

(10) Patent No.: US 11,140,529 B2
(45) Date of Patent: Oct. 5, 2021

(54) MULTI-ACCESS EDGE COMPUTING (MEC) BASED MULTI OPERATOR SUPPORT FOR C-V2X SYSTEMS

(71) Applicant: Intel Corporation, Santa Clara, CA (US)

(72) Inventors: Dario Sabella, Munich (DE); Ana Lucia Pinheiro, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/649,061

(22) PCT Filed: Nov. 26, 2018

(86) PCT No.: PCT/US2018/062481
§ 371 (c)(1),
(2) Date: Mar. 19, 2020

(87) PCT Pub. No.: WO2019/104280
PCT Pub. Date: May 31, 2019

(65) Prior Publication Data
US 2020/0267518 A1    Aug. 20, 2020

Related U.S. Application Data

(60) Provisional application No. 62/591,058, filed on Nov. 27, 2017.

(51) Int. Cl.
*H04W 74/08* (2009.01)
*H04W 72/04* (2009.01)
(Continued)

(52) U.S. Cl.
CPC .......... *H04W 4/40* (2018.02); *G06F 9/45558* (2013.01); *H04W 12/06* (2013.01); *H04W 48/16* (2013.01); *G06F 2009/45595* (2013.01)

(58) Field of Classification Search
None
See application file for complete search history.

(56) References Cited

U.S. PATENT DOCUMENTS

| 2018/0077714 A1* | 3/2018 | Kodaypak ........... H04L 65/1063 |
| 2018/0206089 A1* | 7/2018 | Cavalcanti ............ H04W 4/046 |

(Continued)

FOREIGN PATENT DOCUMENTS

| WO | WO-2017024005 A1 | 2/2017 |
| WO | WO-2017052683 A1 | 3/2017 |

(Continued)

OTHER PUBLICATIONS

"International Application Serial No. PCT US2018 062481, International Preliminary Report on Patentability dated Jun. 11, 2020", 10 pgs.

(Continued)

*Primary Examiner* — Gary Lafontant
(74) *Attorney, Agent, or Firm* — Schwegman Lundberg & Woessner, P.A.

(57) ABSTRACT

A computing device (308) includes communications circuitry to communicate with a first access network (306) and processing circuitry. The processing circuitry is to perform operations to transmit an authorization request for a vehicle-to-everything (V2X) communication to a V2X application function (312) within a service coordinating entity, the request transmitted from the device via the first access network. V2X configuration parameters are received from the service coordinating entity, via the first access network. The V2X configuration parameters are received in response to the authorization request and based on V2X subscription information received by the V2X application function via a V2X application programming interface (API) within the service coordinating entity. A V2X communication link (340) for the V2X communication is established with a (Continued)

second device (326) based on the V2X configuration parameters, the second device associated with a second access network.

25 Claims, 26 Drawing Sheets

(51) Int. Cl.
| | |
|---|---|
| *H04W 72/14* | (2009.01) |
| *H04W 4/06* | (2009.01) |
| *H04W 4/40* | (2018.01) |
| *G06F 9/455* | (2018.01) |
| *H04W 12/06* | (2021.01) |
| *H04W 48/16* | (2009.01) |

(56) References Cited

U.S. PATENT DOCUMENTS

| | | | |
|---|---|---|---|
| 2019/0089780 A1* | 3/2019 | Yousaf | G06F 9/45533 |
| 2019/0273624 A1* | 9/2019 | Hoffmann | H04L 12/14 |
| 2019/0335414 A1* | 10/2019 | Rasanen | H04W 8/10 |
| 2020/0120474 A1* | 4/2020 | Chandramouli | H04W 8/02 |

FOREIGN PATENT DOCUMENTS

| | | |
|---|---|---|
| WO | WO-2017176329 A1 | 10/2017 |
| WO | WO-2019104280 A1 | 5/2019 |

OTHER PUBLICATIONS

"3rd Generation Partnership Project; Technical Specification Group Services and System Aspects; Architecture enhancements for V2X services (Release 14)", 3GPP Standard; Technical Specification; 3GPP TS 23.285, 3rd Generation Partnership Project (3GPP), Mobile Competence Centre; 650 Route Des Lucioles; F-06921 Sophia-Antipolis Cedex; France vol. SA WG2 No. V14.4.0, (Sep. 18, 2017), 1-35.

"3rd Generation Partnership Project; Technical Specification Group Services and System Aspects; Study on Common API Framework for 3GPP Northbound APIs (Release 15)", 3GPP Draft; 23722-110 RM, 3rd Generation Partnership Project (3GPP), Mobile Competence Centre; 650, Route Des Lucioles; F-06921 Sophia-Antipolis Cedex; France, Retrieved from the Internet <URL:http//www.3gpp.org/ftp/tsg_sa/WG6_MisionCritical/Latest_draft SA6 Specs/archive/> [Retrieved on Oct. 16, 2017] the whole document, (Oct. 16, 2017).

"3rd Generation Partnership Project; Technical Specification Group Services and System Aspects; System Architecture for the 5G System; Stage 2 (Release 15)", 3GPP Standard, Technical Specification; 3GPP TS 23.501, 3rd Generation Partnership Project (3GPP), Mobile Competence Centre; 650 Route Des Lucioles; F-06921 Sophia-Antipolis Cedex; France, vol. SA WG2 No. V1.5.0, (Nov. 13, 2017), 1-170.

"International Application Serial No. PCT/US2018/062481, International Search Report dated Feb. 26, 2019", 6 pgs.

"International Application Serial No. PCT/US2018/062481, Written Opinion dated Feb. 26, 2019", 11 pgs.

\* cited by examiner

MULTI-ACCESS EDGE COMPUTING (MEC) BASED MULTI OPERATOR SUPPORT FOR C-V2X SYSTEMS

PRIORITY CLAIM

This application is a U.S. National Stage Filing Under 35 U.S.C. 371 from International Application No. PCT/US2018/062481, filed on Nov. 26, 2018, which claims benefit of priority to U.S. Provisional Application Ser. No. 62/591,058, filed Nov. 27, 2017, which are incorporated herein by reference by their entirety.

The above-identified U.S. Provisional Application is incorporated herein by reference in its entirety.

TECHNICAL FIELD

Embodiments described herein generally relate to multi-access edge computing (MEC) and related wireless communication systems. More specifically, aspects of the disclosure relate to MEC based multi-operator support for cellular vehicle-to-everything (C-V2X) communication systems.

BACKGROUND

MEC encompasses architectures that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC is intended to support developing mobile use cases of edge computing, to allow application developers and content providers to access computing capabilities and an IT service environment in dynamic settings at the edge of the network. Edge computing, at a more general level, refers to the movement of compute and storage resources closer to, or into, smart endpoint devices in order to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources. Edge computing may be further integrated with use cases and technology developed for the Internet-of-Things (IoT) and Fog networking, as endpoint devices and gateways attempt to access network resources and applications at locations moved closer to the "edge" of the network.

In these and other settings, edge computing attempts to offer reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for a MEC-based multi-operator support for C-V2X communication systems. As an overview, the technological solutions disclosed herein integrate MEC with various types of IoT or Fog networking implementations. These may benefit a variety of use cases, such as fifth generation (5G) network communications among automotive devices, including those use cases termed as vehicle-to-vehicle (V2V), vehicle-to-infrastructure (V2I), and vehicle-to-everything (V2X). As with most MEC installations, the goal with the present configurations is to bring the application endpoints as close to the vehicular environment, or other endpoints, as possible, to enable low latency or high bandwidth services. These systems and techniques may be implemented in, or augment, virtualized environments which may be implemented within various types of MEC, network function virtualization (NFV), or fully virtualized 5G network environments.

As is understood, MEC architectures offer application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments. For example, regarding the automotive sector, applications such as V2X (e.g., IEEE 802.11p, or 3GPP LTE-V2X) exchange data, provide data to aggregation points, or access data in databases, to ascertain an overview of the local situation derived from a multitude of sensors (e.g., by various cars, roadside units, etc.).

Techniques disclosed herein may be used to provide V2X service continuity within a C-V2X communication architecture that includes different network providers in the same country and/or different countries. More specifically, the following describes techniques for authorizing V2X communications between devices associated with the same or different public land mobile networks (PLMNs) using MEC-based functionalities, including determination of V2X configuration parameters (e.g., PC5 configuration parameters) for use within the same or different PLMNs. This is achieved, in some examples, with the use of a MEC V2X application programming interface (API) residing within a MEC entity, with the MEC V2X API providing an interface between a MEC application acting as a V2X application function for purposes of authorizing V2X communications and providing V2X configuration parameters for authorized V2X communications.

Figure 1A:
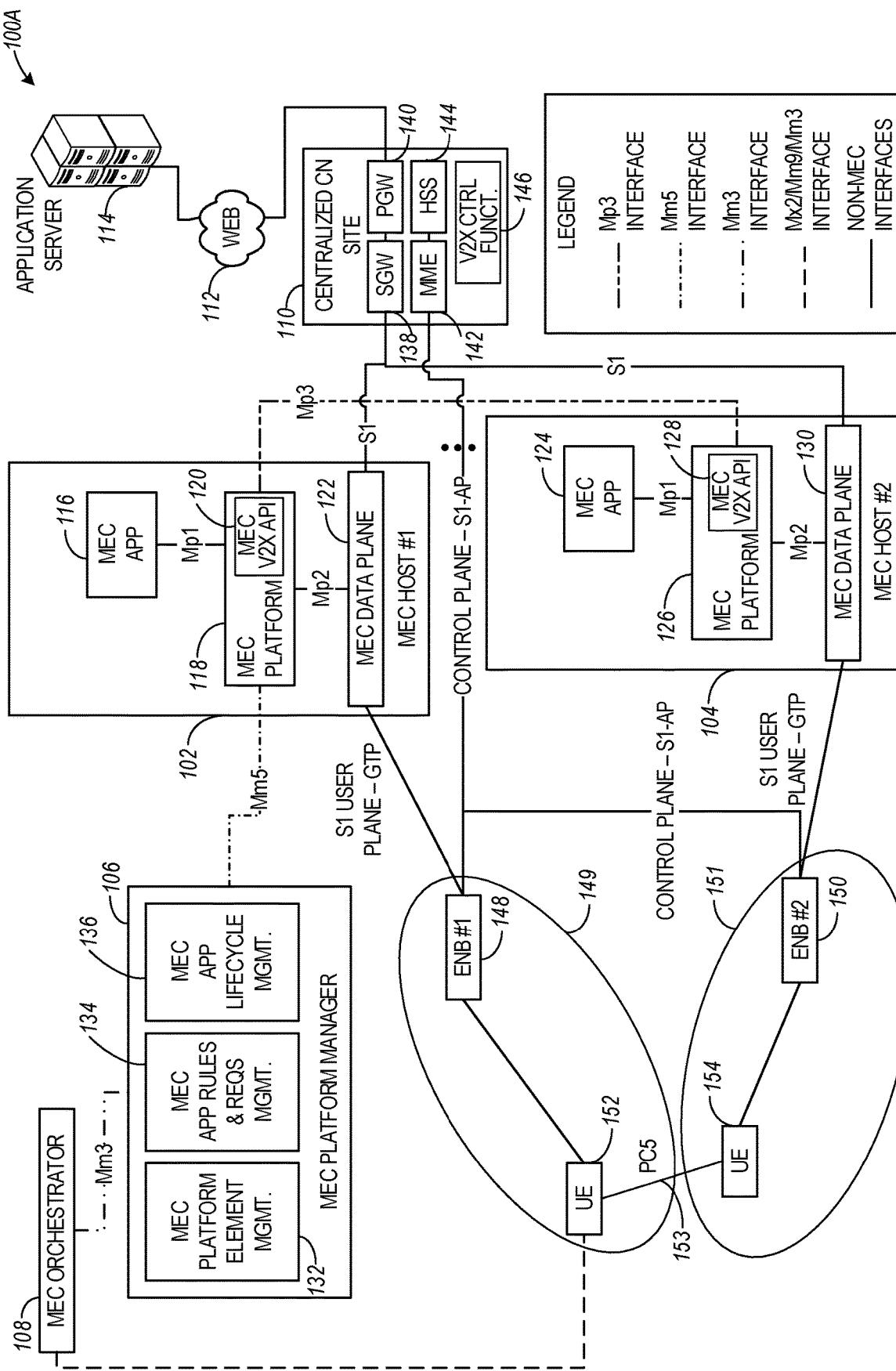
FIG. 1A illustrates a C-V2X communication infrastructure with a common core network, according to an example.

FIG. 1A illustrates a C-V2X communication infrastructure 100A with a common core network, according to an example. The illustrated system is an implementation that operates within the ETSI MEC ISG framework. The connections represented by some form of a dashed line (as noted in the legend in FIG. 1A) may be defined according to a specification from an ETSI MEC standards family.

The C-V2X communication infrastructure 100A can include entities from a MEC-based architecture as well as entities from a third generation partnership project (3GPP) based architecture. For example, the C-V2X communication infrastructure 100A can include a plurality of MEC hosts such as MEC hosts 102 and 104, a MEC platform manager 106, and a MEC orchestrator 108. The 3GPP based entities can include a centralized core network (CN) 110 coupled to an application server 114 via the network 112 (e.g., the Internet), as well as radio access networks (RANs) represented by base stations 148 and 150 coupled to corresponding user equipments (UEs) 152 and 154. The base stations 148 and 150 can include evolved Node-Bs (eNBs), Next Generation Node-Bs (gNBs), or other types of base stations.

In a vehicular communication context, the C-V2X communication infrastructure 100A can be implemented by different network operators in the same country and/or in different countries. For example, the radio access network associated with base station 148 (with a coverage area 149) can be within a first public land mobile network (PLMN) (i.e., associated with a first mobile services provider or operator), and base station 150 (with a coverage area 151) can be within a second public land mobile network (PLMN) (i.e., associated with a second mobile services provider or operator). As used herein, the terms "mobile services provider" and "mobile services operator" are interchangeable.

In this regard, the C-V2X communication infrastructure 100A can be associated with a multi-operator scenario composed by two coverage areas 149 and 151 where V2X services can be provided, with each coverage area being operated by a mobile services operator. Techniques disclosed herein can be used to provide V2X service continuity across coverage areas associated with one or more mobile services operators, without service disruption and by ensuring end-to-end (E2E) performances. Techniques disclosed herein allow for vehicles from different operators to communicate with each other, either in-coverage or out-of-coverage areas.

The solid line connections in FIG. 1A represent non-MEC connections, such as utilizing 3 GPP cellular network connections S1, S1-AP, etc. Other connection techniques (e.g., protocols) and connections may also be used. Accordingly, in the scenario of FIG. 1A, the system entities (e.g., MEC orchestrator 108, MEC platform manager 106, MEC hosts 102, 104 are connected by MEC (or NFV) logical links (indicated with dashed lines), in addition to network infrastructure links (e.g., a 5G Long Term Evolution (LTE) network, such as provided among UEs 152, 154, eNBs 148, 150, a CN site 110, etc.) (indicated with solid lines). Further connection to cloud services (e.g., an application server 114 access via the network 112) may also be connected via backhaul network infrastructure links.

Techniques disclosed herein apply to 4G/LTE/LTE-A (LTE Advanced) and 5G networks, with the examples and aspects disclosed using 4G/LTE networks, as they apply to C-V2X, which is designed and optimized for LTE-A. In aspects, the CN 110 may be an evolved packet core (EPC) network, a NextGen Packet Core (NPC) network, or some other type of CN (e.g., as illustrated in reference to FIGS. 4A-5D). In EPC (Evolved Packet Core), which is associated with 4G/LTE, the CN 110 can include a serving gateway (S-GW or SGW) 138, a packet data network (PDN) gateway (P-GW or PGW) 140, a mobility management entity (MME) 142, and a home subscriber server (HSS) 144 coupled to a V2X control function 146. In 5G, the Core Network is referred to as the NextGen Packet Network (NPC). In NPC, the S/P-GW are replaced with UPF, and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 148, 150 and the S-GW 138 via the MEC hosts 102, 104, and the S1-AP (control plane) interface which is a signaling interface between the eNBs 148, 150 and the MME 142.

The MME 142 may be similar in function to the control plane of legacy Serving General Packet Radio Service (GPRS) Support Nodes (SGSN). The MME 142 may manage mobility aspects in access such as gateway selection and tracking area list management. The HSS 144 may comprise a database for network users, including subscription-related information to support the network entities' handling of communication sessions, including subscription information associated with V2X communications. The CN 110 may comprise one or several HSSs 144, depending on the number of mobile subscribers, on the capacity of the equipment, on the organization of the network, etc. For example, the HSS 144 can provide support for routing/roaming, authentication, authorization (e.g., V2X communication authorization), naming/addressing resolution, location dependencies, etc.

The S-GW 138 may terminate the S1 interface 413 towards the RANs of eNBs 148, 150, and route data packets between the RANs and the CN 110. In addition, the S-GW 138 may be a local mobility anchor point for inter-RAN node handovers and also may provide an anchor for inter-3GPP mobility. Other responsibilities may include lawful intercept, charging, and some policy enforcement.

The P-GW 140 may terminate an SGi interface toward a PDN. The P-GW 140 may route data packets between the RANs and external networks such as a network including the application server (AS) 114 (alternatively referred to as application function (AF)) via an Internet Protocol (IP) interface (e.g., an interface to the network 112 coupled to the AS 114. The P-GW 140 can also communicate data to other external networks, which can include the Internet, IP multimedia subsystem (IPS) network, and other networks. Generally, the application server 114 may be an element offering applications that use IP bearer resources with the core network (e.g., UMTS Packet Services (PS) domain, LTE PS data services, etc.). The application server 114 can also be configured to support one or more communication services (e.g., Voice-over-Internet Protocol (VoIP) sessions, PTT sessions, group communication sessions, social networking services, etc.) for the UEs 152, 154 via the CN 110 and one or more of the MEC hosts 102, 104.

The P-GW 140 may further include a node for policy enforcement and charging data collection. A Policy and Charging Enforcement Function (PCRF) (not illustrated in FIG. 1A) can be the policy and charging control element of the CN 110. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF may be communicatively coupled to the application server 114 via the P-GW 140. The application server 114 may signal the PCRF to indicate a new service flow and select the appropriate Quality of Service (QoS) and charging parameters.

In some aspects, the V2X control function 146 can be used in connection with authorizing UEs to use V2X services based on HSS information (e.g., subscription information managed by the HSS 144), assist one or more UEs in obtaining the network address of an application server (e.g., 114) or a V2X application server, as well as providing V2X configuration parameters for direct communication (i.e., device-to-device communications). The interface for direct device-to-device communication is referred to as PC5. The PC5 parameters may be provided by the V2X control function to one or more UEs for purposes of configuring V2X communication between the UEs. For example, techniques disclosed herein can be used for authorizing UEs 152, 154 for V2X communications and provisioning V2X configuration parameters to the UE for purposes of establishing a V2X communication link 153 (e.g., a V2X communication link using a PC5 communication interface).

The MEC host 102 can include an MEC platform 118, which can be coupled to one or more MEC applications (apps) such as MEC app 116 and to MEC data plane 122. The MEC host 104 can include an MEC platform 126, which can be coupled to a MEC app 116 and MEC data plane 130. The MEC platform manager 106 can include a MEC platform element management module 132, a MEC application rules and requirements management module 134, and MEC application lifecycle management module 136. Additional description of the MEC related entities 102, 104, 106, and 108 are provided herein below in connection with FIG. 10.

Figure 1B:
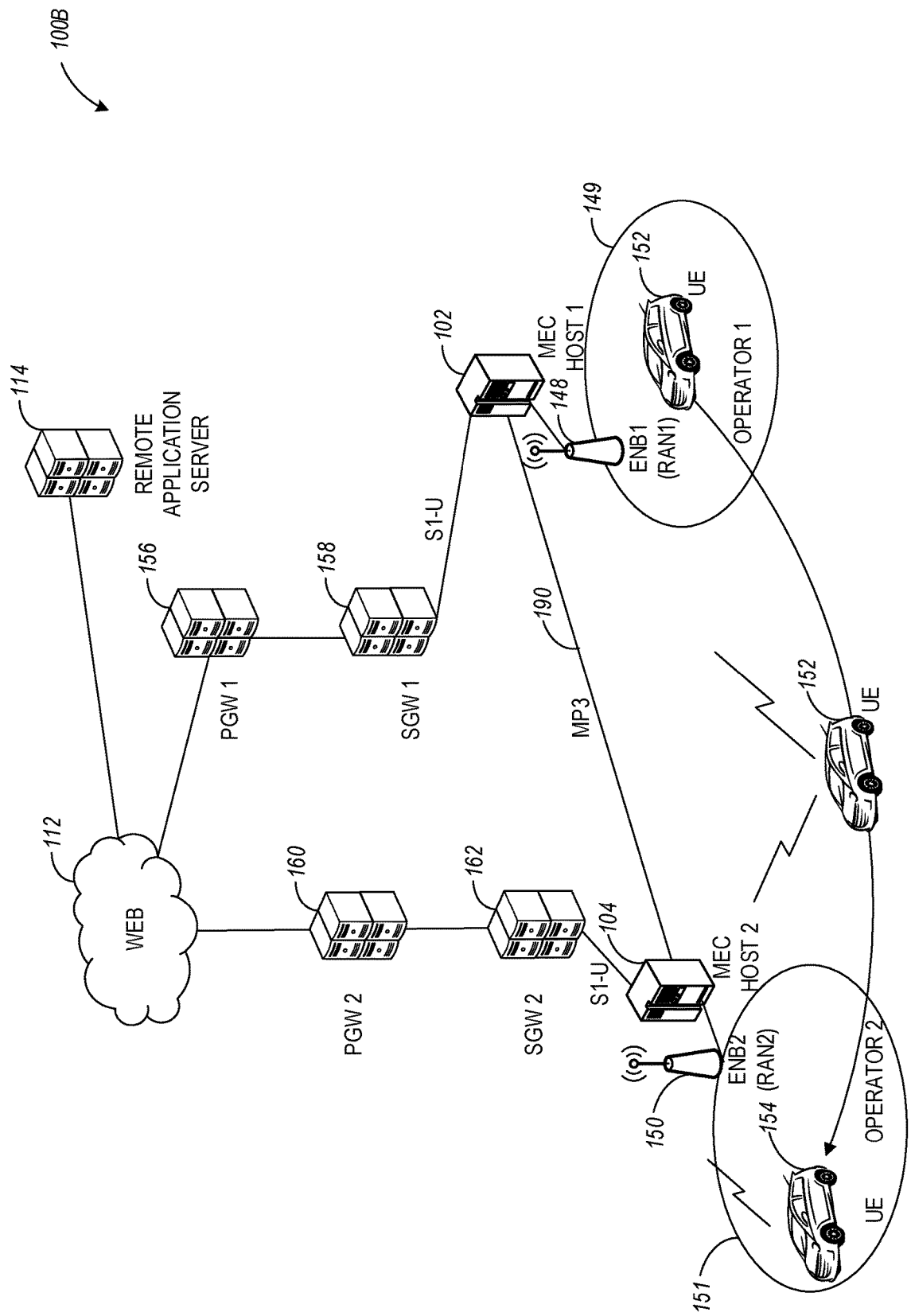
FIG. 1B illustrates a C-V2X communication infrastructure with separate core networks and separate MEC hosts coupled to corresponding radio access networks, according to an example.
Figure 1C:
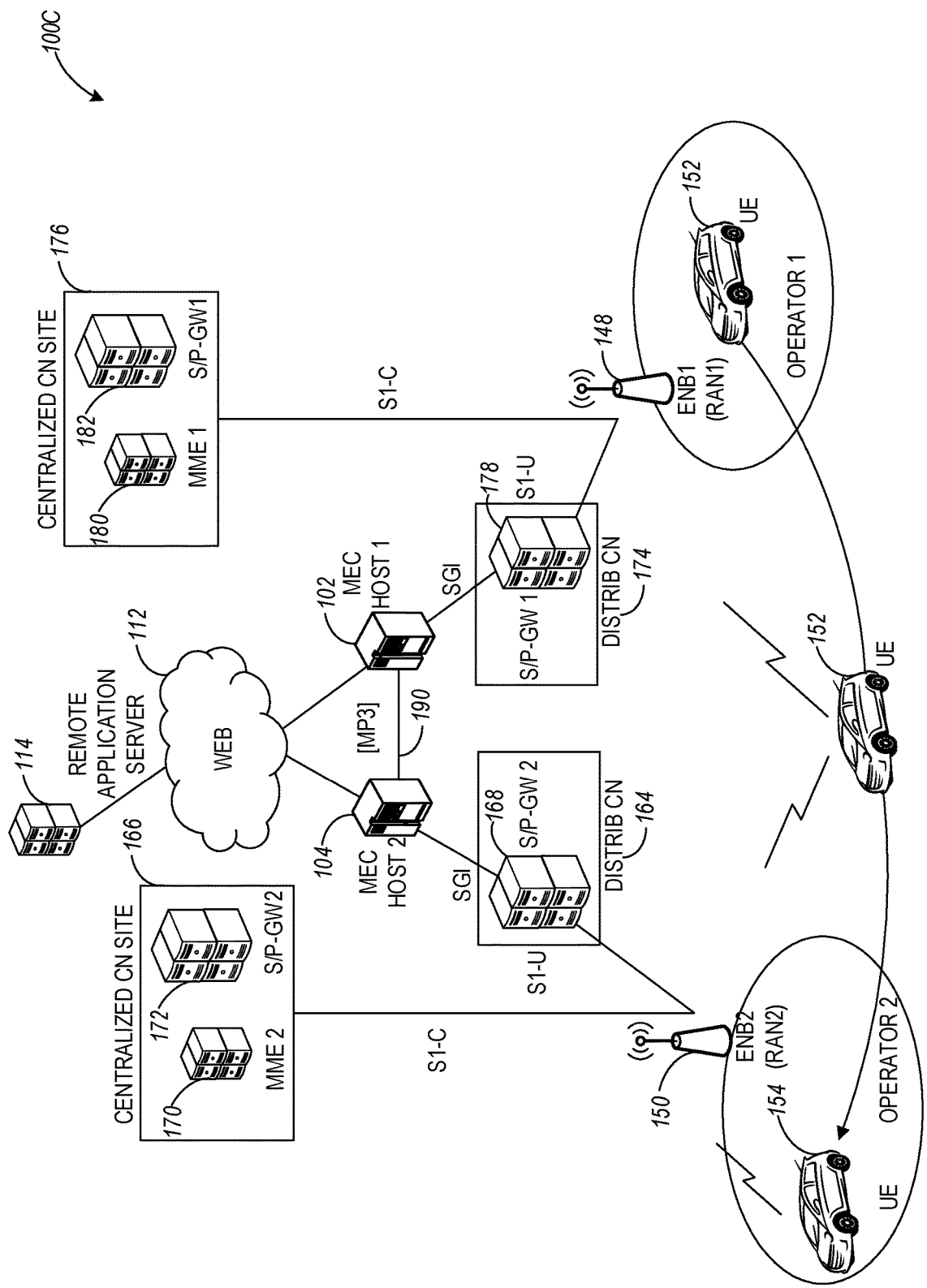
FIG. 1C illustrates a C-V2X communication infrastructure with separate MEC hosts coupled to separate distributed core networks, according to an example.

In some aspects, one or more of the functions performed by the V2X control function 146 can be performed by a MEC host within the C-V2X communication infrastructure 100A. More specifically, a MEC host such as host 102 can implement a MEC app 116 performing various V2X application functions, such as managing V2X communication authorizations and provisioning of V2X configuration parameters. In this regard, the MEC platform 118 can include an API, such as MEC V2X API 120, which can be used in connection with gathering relevant subscription information from the core network 110 (e.g., subscription information from the HSS 144) as well as communication of V2X configuration parameters or other data between the MEC host 102 and other MEC related entities. In this regard, by offloading functionalities typically performed by a V2X control function to one or more MEC hosts, MEC based support can be provided to ensure alignment of V2X related services across different domains managed by different mobile services providers, including instances when a UE is outside of network coverage of a mobile services provider. Additional MEC hosts, such as MEC host 104, can also implement the same APIs as host 102, such as MEC V2X API 128 to perform similar functionalities in connection with V2X authorization or other V2X communication related functionalities. FIG. 1B and FIG. 1C illustrate C-V2X communication infrastructures that can implement the above described features as well as techniques disclosed herein for MEC based multi-operator support.

FIG. 1B illustrates a C-V2X communication infrastructure 100B with separate core networks and separate MEC hosts coupled to corresponding radio access networks, according to an example. Referring to FIG. 1B, the C-V2X communication infrastructure 100B is similar to the C-V2X communication infrastructure 100A of FIG. 1A, except that each of the MEC hosts 102 and 104 in infrastructure 100B is coupled to a separate core network. More specifically, MEC host 102 is coupled to a first core network that includes SGW 158 and PGW 156. MEC host 104 is coupled to a second core network that includes SGW 162 and PGW 160. Both core networks can be coupled to the remote application server 114 via the network 112. As illustrated in FIG. 1B, MEC hosts 102 and 104 can be coupled to each other via a MEC-based interface 190, which can include a MP3 interface or another type of interface. Additionally, the MEC hosts can be located on the S1 interfaces of the core networks, downstream between the core network and the corresponding RANs of eNBs 148 and 150. In some aspects and as illustrated in FIG. 1B, UEs 152 and 154 can be located within vehicles or other mobile devices.

FIG. 1C illustrates a C-V2X communication infrastructure 100C with separate MEC hosts coupled to separate distributed core networks, according to an example. In some aspects, each of the MEC hosts 102, 104 in infrastructure 100C is coupled to a corresponding SGi interface associated with separate distributed core networks. More specifically, MEC host 102 is coupled to a first distributed core network 174 that includes SGW/PGW 178. MEC host 104 is coupled to a second distributed core network 164 that includes SGW/PGW 168. Both distributed core networks can be coupled to the remote application server 114 via SGi interfaces with the MEC hosts 102, 104 and the network 112. As illustrated in FIG. 1C, MEC hosts 102 and 104 can be coupled to each other via a MEC-based interface 190, which can include a Mp3 interface or another type of interface.

Additionally, the RANs associated with eNBs 148, 150 can be coupled to corresponding centralized core networks 176 and 166. Centralized CN 166 can include MME 170 and SGW/PGW 172, while centralized CN 176 can include MME 180 and SGW/PGW 182. In some aspects and as illustrated in FIG. 1C, UEs 152 and 154 can be located within vehicles or other mobile devices.

Figure 2:
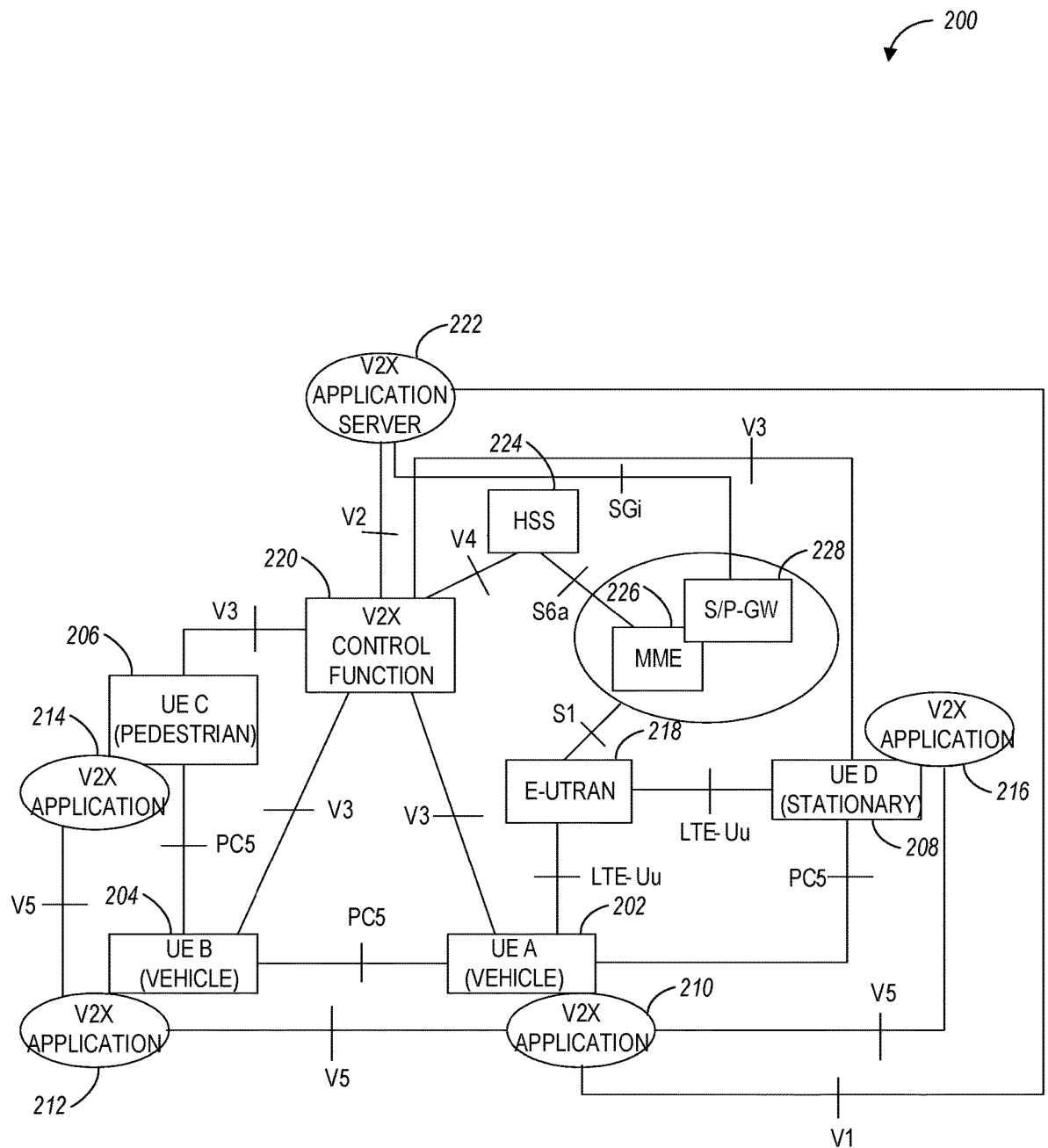
FIG. 2 illustrates a V2X communication infrastructure using a V2X control function, according to an example.

FIG. 2 illustrates a V2X communication infrastructure 200 using a V2X control function, according to an example. Referring to FIG. 2, the V2X communication infrastructure 200 can be a 3GPP communication infrastructure that includes an evolved universal terrestrial radio access network (E-UTRAN) 218 coupled to a core network. The core network of the infrastructure 200 can include MME 226, SGW/PGW 228, HSS 224, and a V2X control function 220. A plurality of UEs, such as UEs 202 and 208, can be connected to the E-UTRAN 218 via LTE-UU interfaces. A plurality of additional UEs, such as UEs 204 and 206, can be configured for V2X communications based on configuration information from the V2X application server 222. Some of the UEs within infrastructure 200 can be located within moving vehicles (e.g., UEs 202 and 204), some of the UEs can be stationary (e.g., UE 208), and some UEs can be located with a pedestrian (e.g., UE 206).

In some aspects, each of the UEs 202, 204, 206, and 208 can be running corresponding V2X applications 210, 212, 214, and 216. The V2X applications can communicate via a V5 interface, and V2X communications between corresponding UEs can take place using a PC5 interface, as illustrated in FIG. 2.

The V2X control function 220 within the 3GPP communication infrastructure 200 can be configured to perform the following V2X related functionalities: communicate a network address of the V2X application server 222 two various UEs so that the UEs can access V2X applications and can request authorization for using V2X communication services; authorizing the UEs to use V2X services based on subscription information maintained by the HSS 224; and provide V2X configuration parameters to the UEs upon successful authorization of the UEs four using V2X services.

Since the V2X control function 220 is part of a 3GPP infrastructure, there may be challenges in providing V2X communication services in communication infrastructures with multiple mobile services operators, each associated with a separate public land mobile network (PLMN). If Pc5 parameters are different, two UEs cannot communicate directly in a device-to-device V2X communication. In some aspects and as described herein, MEC based entities can be used to fully (or partially) perform the functionalities of a V2X control function associated with a 3GPP infrastructure, such as notifying UEs of a network address of a V2X application server that can accept authorization requests for V2X communications, performing V2X communication authorizations, negotiating common set of V2X configuration parameters between multiple mobile services operators, and communicating V2X configuration parameters to UEs that have been authorized for V2X communications (where the provisioning of V2X communication parameters can be outside of the 3GPP domain associated with each PLMN).

In order to ensure alignment across different mobile services operators' domains (also in absence of cellular coverage), techniques disclosed herein can support a MEC based solution, including MEC apps acting as V2X application functions and running on MEC Hosts (e.g., using at least one MEC host for each operator domain). In some aspects, the MEC apps can be configured to communicate securely with 3GPP core network entities through a MEC V2X API (which can be an API that is part of the MEC platform of each MEC host). The MEC V2X API can be used for gathering relevant information from the 3GPP network (e.g., a list of authorized UEs, additional information about the authorization based on the UE subscription, the relevant PC5 configuration parameters or other V2X configuration parameters, and so forth).

Techniques disclosed herein can be used in connection with communication of a network address information of the V2X MEC host/application server to a UE in order for the UE to request authorization to use V2X services; obtain V2X related subscription information (e.g., a list of UEs subscribed to V2X services) by the V2X MEC host/application server; and configuring PC5 parameters or other type of V2X configuration parameters in a multi-PLMN architecture. In this regard, service continuity for V2X users can be ensured in multi-operator environments (e.g., with multiple PLMNs) where some of the V2X users may be outside of the 3GPP domain coverage.

Figure 3:
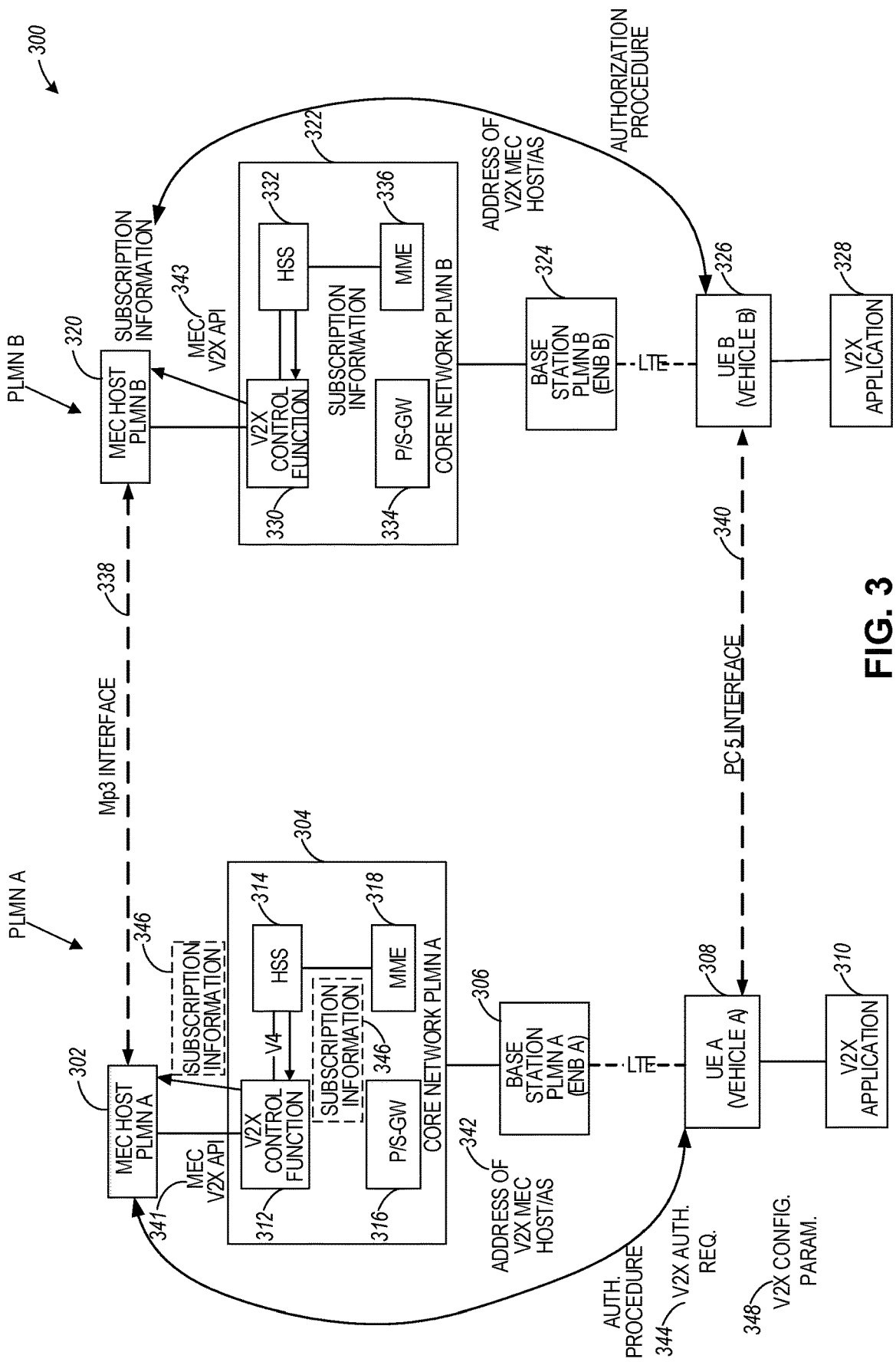
FIG. 3 is a block diagram of a C-V2X communication infrastructure performing V2X authorization by a MEC host, according to an example.

FIG. 3 is a block diagram of a C-V2X communication infrastructure 300 performing V2X authorization by a MEC host, according to an example. Referring to FIG. 3, the C-V2X communication infrastructure 300 includes two coverage areas (PLMN A and PLMN B) where V2X services are provided by a separate mobile operator (e.g., designating different countries or simply areas with partially overlapped coverages). The first coverage area of PLMN A includes a MEC host 302, a core network 304, a base station (e.g., eNB) 306, and a UE 308 running a V2X application 310. The core network 304 includes a V2X control function 312, a HSS 314, a PGW/SGW 316, and a MME 318, which can perform functionalities performed by any of the V2X control function, HSS, PGW/SGW, and MME described in connection with any of the preceding figures. The second coverage area of PLMN B includes a MEC host 320, a core network 304, a base station (e.g., eNB) 306, and a UE 308 running a V2X application 310. The core network 322 includes a V2X control function 330, a HSS 332, a PGW/SGW 334, and a MME 336.

In some aspects, the MEC host 302 can include a MEC V2X API 341, which can be used for communication with the V2X control function 312 in gathering PC5 V2X relevant information from the core network 304. The MEC host 302 may also use the MEC V2X API 341 to obtain subscription information 346 which can originate from the HSS 314. Even though not illustrated in FIG. 3, other V2X relevant information can be communicated via the MEC V2X API 341, including V2X configuration parameters that may be available to the core network 304 as well as other V2X related information such as a list of authorized UEs that can perform V2X communication functions, the UE capabilities, etc.

In some aspects, a network address 342 of the MEC host 302 can be communicated to the UE 308 via the V2X Control Function 312 and the eNB 306. For example, UE 308 can receive higher layer signaling such as radio resource control (RRC) signaling or non-access stratum (NAS) signaling that includes the network address 342. Such higher layer signaling can originate from the V2X control function 312 or other core network entities such as the V2X control function communicating to the UE via the V3 interface. In some aspects, the network address 342 of the MEC host 302 can be preconfigured in the UE or a well-known host address can be used (e.g., a reserved network address that is known to UEs within the PLMN).

In some aspects, the MEC host 302 can obtain the subscription information 346 or other relevant V2X authorization information using a database outside of the 3GPP domain of the core network 304. In some aspects, a list of authorized UEs for V2X services can be pre-provisioned by mobile services operators and provided to the MEC hosts (e.g., MEC host 302) off-line. Yet in other aspects, subscription information 346 can be communicated from the HSS 314 to the V2X control function 312 via a V4 interface, and the MEC host 302 can access the subscription information 346 via the MEC V2X API 341.

In operation, UE 308 can receive the network address 342 of the MEC host 302 and can communicate a V2X authorization request 344 to the MEC host 302 using the network address 342. The MEC host 302 may obtain the subscription information 346 in order to determine if the UE 308 is authorized for V2X communications. A V2X authorization along with V2X configuration parameters 348 can be communicated back to the UE 308. The UE 308 can use the V2X configuration parameters 348, which can include PC5 configuration parameters, to establish a V2X communication link 340 with the UE 326 that is active within PLMN B.

The MEC V2X API 343 associated with MEC host 320 can perform similar functionalities as discussed in connection with the MEC V2X API 341. In some aspects, MEC hosts 302 can be connected to MEC host 320 via interface 338, which can include a Mp3 interface or another type of interface. In some aspects, one or more MEC applications within the MEC host 302 can communicate with one or more MEC applications within MEC host 320 via the MEC V2X APIs 341 and 343 as well as the communication link 338. Such host-to-host communication can be used in connection with negotiating a common set of V2X configuration parameters, as explained herein below.

Even though subscription information 346 is illustrated as originating from HSS 314, the disclosure is not limited in this regard and other techniques can be used for obtaining subscription information in connection with, e.g., evolved packet core (EPC) or 5G communication networks as discussed herein below in connection with FIG. 4A-FIG. 5D.

Figure 4A:
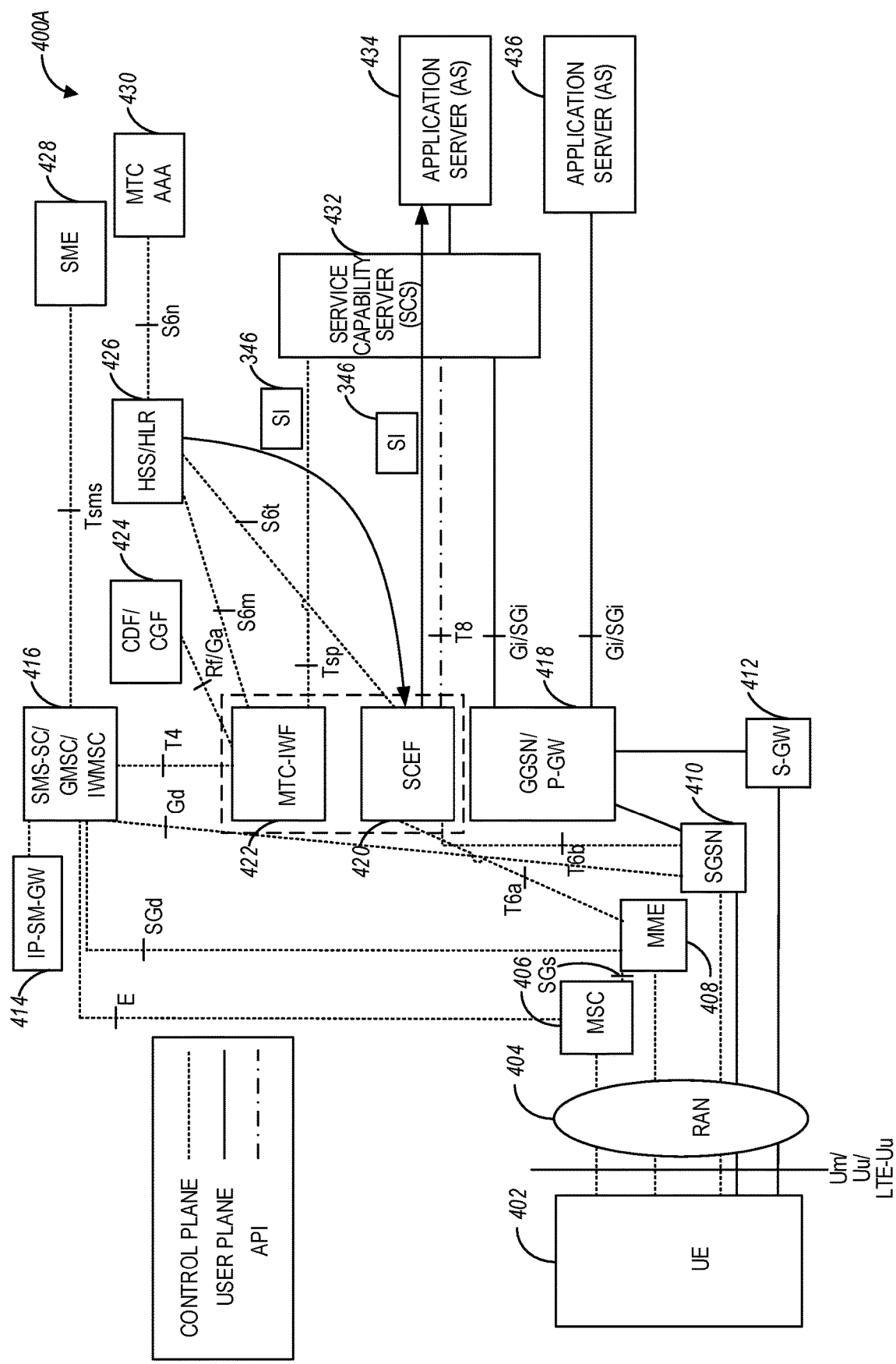
FIG. 4A illustrates an example Cellular Internet-of-Things (CIoT) network architecture, according to an example.

FIG. 4A illustrates an example Cellular Internet-of-Things (CIoT) network architecture 400A, according to an example. Referring to FIG. 4A, the CIoT architecture 400A can include the UE 402 and the RAN 404 coupled to a plurality of core network entities. In some aspects, the UE 402 can be a machine-type communication (MTC) UE. The CIoT network architecture 400A can further include a mobile services switching center (MSC) 406, MME 408, a serving GPRS support note (SGSN) 410, a S-GW 412, an IP-Short-Message-Gateway (IP-SM-GW) 414, a Short Message Service-Service Center (SMS-SC)/gateway mobile service center (GMSC)/Interworking MSC (IWMSC) 416, MTC interworking function (MTC-IWF) 422, a Service Capability Exposure Function (SCEF) 420, a gateway GPRS support node (GGSN)/Packet-GW (P-GW) 418, a charging data function (CDF)/charging gateway function (CGF) 424, a home subscriber server (HSS)/a home location register (HLR) 426, short message entities (SME) 428, MTC authorization, authentication, and accounting (MTC AAA) server 430, a service capability server (SCS) 432, and application servers (AS) 434 and 436. In some aspects, the SCEF 420 can be configured to securely expose services and capabilities provided by various 3GPP network interfaces. The SCEF 420 can also provide means for the discovery of the exposed services and capabilities, as well as access to network capabilities through various network application programming interfaces (e.g., API interfaces to the SCS 432).

FIG. 4A further illustrates various reference points between different servers, functions, or communication nodes of the CIoT network architecture 400A. Some example reference points related to MTC-IWF 422 and SCEF 420 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 422 and the SMS-SC 416 in the HPLMN), T6a (a reference point used between SCEF 420 and serving MME 408), T6b (a reference point used between SCEF 420 and serving SGSN 410), T8 (a reference point used between the SCEF 420 and the SCS/AS 434, 436), S6m (a reference point used by MTC-IWF 422 to interrogate HSS/HLR 426), S6n (a reference point used by MTC-AAA server 430 to interrogate HSS/HLR 426), and S6t (a reference point used between SCEF 420 and HSS/HLR 426).

In some aspects, the CIoT UE 402 can be configured to communicate with one or more entities within the CIoT architecture 400A via the RAN 404 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the CIoT UE 402 and an Evolved Packet System (EPS) Mobile Management Entity (MME) 421 and SGSN 462. In some aspects, the CIoT network architecture 400A can include a packet data network, an operator network, or a cloud service network, having, for example, among other things, servers such as the Service Capability Server (SCS) 432, the AS 434, or one or more other external servers or network components. In some aspects, the UE 402 can be configured for V2X communications within the architecture 400A using one or more of the techniques disclosed herein.

The RAN 404 can be coupled to the HSS/HLR servers 426 and the AAA servers 430 using one or more reference points including, for example, an air interface based on an S6a reference point, and configured to authenticate/authorize CIoT UE 402 to access the CIoT network. The RAN 404 can be coupled to the CIoT network architecture 400A using one or more other reference points including, for example, an air interface corresponding to an SGi/Gi interface for 3GPP accesses. The RAN 404 can be coupled to the SCEF 420 using, for example, an air interface based on a T6a/T6b reference point, for service capability exposure. In some aspects, the SCEF 420 may act as an API GW towards a third-party application server such as AS 434. The SCEF 420 can be coupled to the HSS/HLR 426 and MTC AAA 430 servers using an S6t reference point and can further expose an Application Programming Interface to network capabilities.

In certain examples, one or more of the CIoT devices disclosed herein, such as the CIoT UE 402, the CIoT RAN 4104, etc., can include one or more other non-CIoT devices, or non-CIoT devices acting as CIoT devices, or having functions of a CIoT device. For example, the CIoT UE 402 can include a smart phone, a tablet computer, or one or more other electronic device acting as a CIoT device for a specific function, while having other additional functionality. In some aspects, the RAN 404 can include a CIoT enhanced Node B (CIoT eNB) communicatively coupled to a CIoT Access Network Gateway (CIoT GW). In certain examples, the RAN 404 can include multiple base stations (e.g., CIoT eNBs or other types of base stations) connected to the CIoT GW, which can include MSC 406, MME 408, SGSN 410, or S-GW 412. In certain examples, the internal architecture of RAN 404 and the CIoT GW may be left to the implementation and need not be standardized.

In some aspects, the subscription information 346 can be communicated from the HSS 426 to the SCEF 420 via the S6t interface. The SCEF 420 can communicate the subscription information 346 to the SCS 432 and onto an application server 434 which can be a MEC host such as MEC host 302.

Figure 4B:
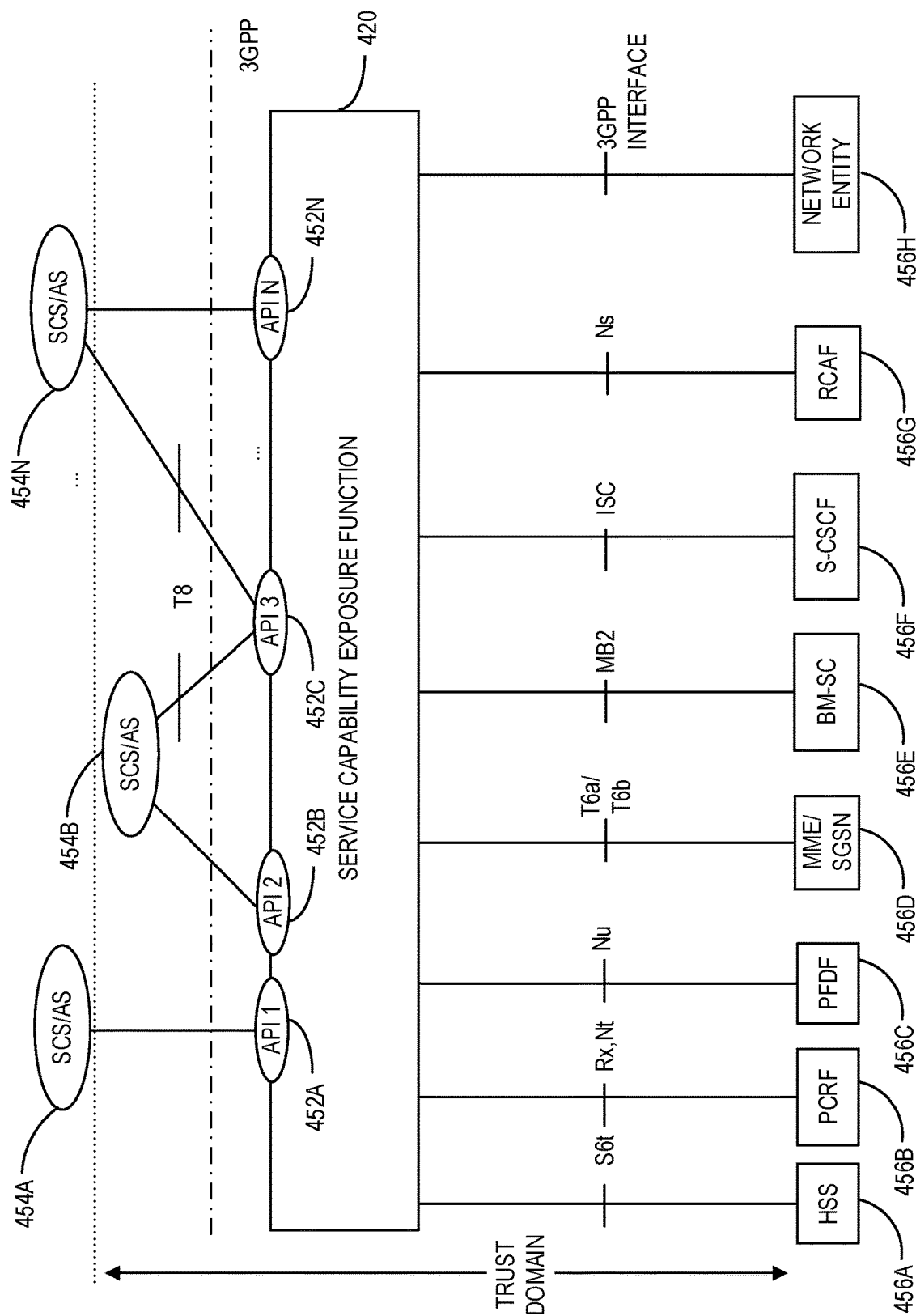
FIG. 4B illustrates an example Service Capability Exposure Function (SCEF), according to an example.

FIG. 4B illustrates an example Service Capability Exposure Function (SCEF), according to an example. Referring to FIG. 4B, the SCEF 472 can be configured to expose services and capabilities provided by 3GPP network interfaces to external third-party service provider servers hosting various applications. In some aspects, a 3GPP network such as the CIoT architecture 400A, can expose the following services and capabilities: a home subscriber server (HSS) 456A, a policy and charging rules function (PCRF) 456B, a packet flow description function (PFDF) 456C, a MME/SGSN 456D, a broadcast multicast service center (BM-SC) 456E, a serving call server control function (S-CSCF) 456F, a RAN congestion awareness function (RCAF) 456G, and one or more other network entities 456H. The above-mentioned services and capabilities of a 3GPP network can communicate with the SCEF 420 via one or more interfaces as illustrated in FIG. 4B. The SCEF 420 can be configured to expose the 3GPP network services and capabilities to one or more applications running on one or more service capability server (SCS)/application server (AS), such as SCS/AS 454A, 454B, . . . , 454N. Each of the SCS/AS 454A-454N can communicate with the SCEF 420 via application programming interfaces (APIs) 452A, 452B, 452C, . . . , 452N, as seen in FIG. 4B.

Figure 4C:
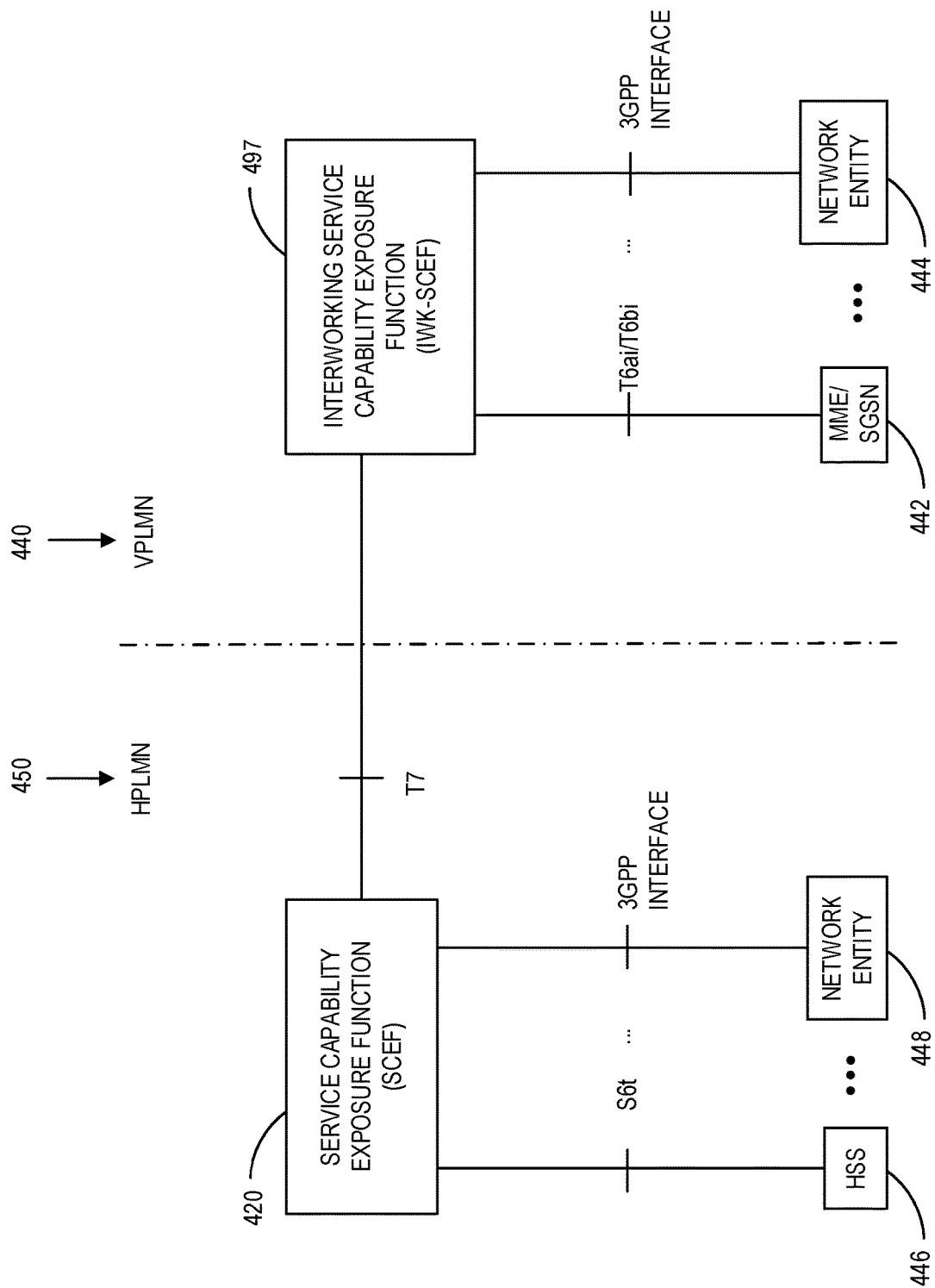
FIG. 4C illustrates an example roaming architecture for SCEF, according to an example.

FIG. 4C illustrates an example roaming architecture for SCEF, according to an example. Referring to FIG. 4C, the SCEF 420 can be located in a home PLMN (HPLMN) 450 and can be configured to expose 3GPP network services and capabilities, such as 446, . . . , 448. In some aspects, 3GPP network services and capabilities, such as 442, . . . , 444 can be located within a visiting PLMN (VPLMN) 440. In this case, the 3GPP network services and capabilities within the VPLMN 440 can be exposed to the SCEF 4420 via an interworking SCEF (IWK-SCEF) 497 within the VPLMN 440.

Figure 5A:
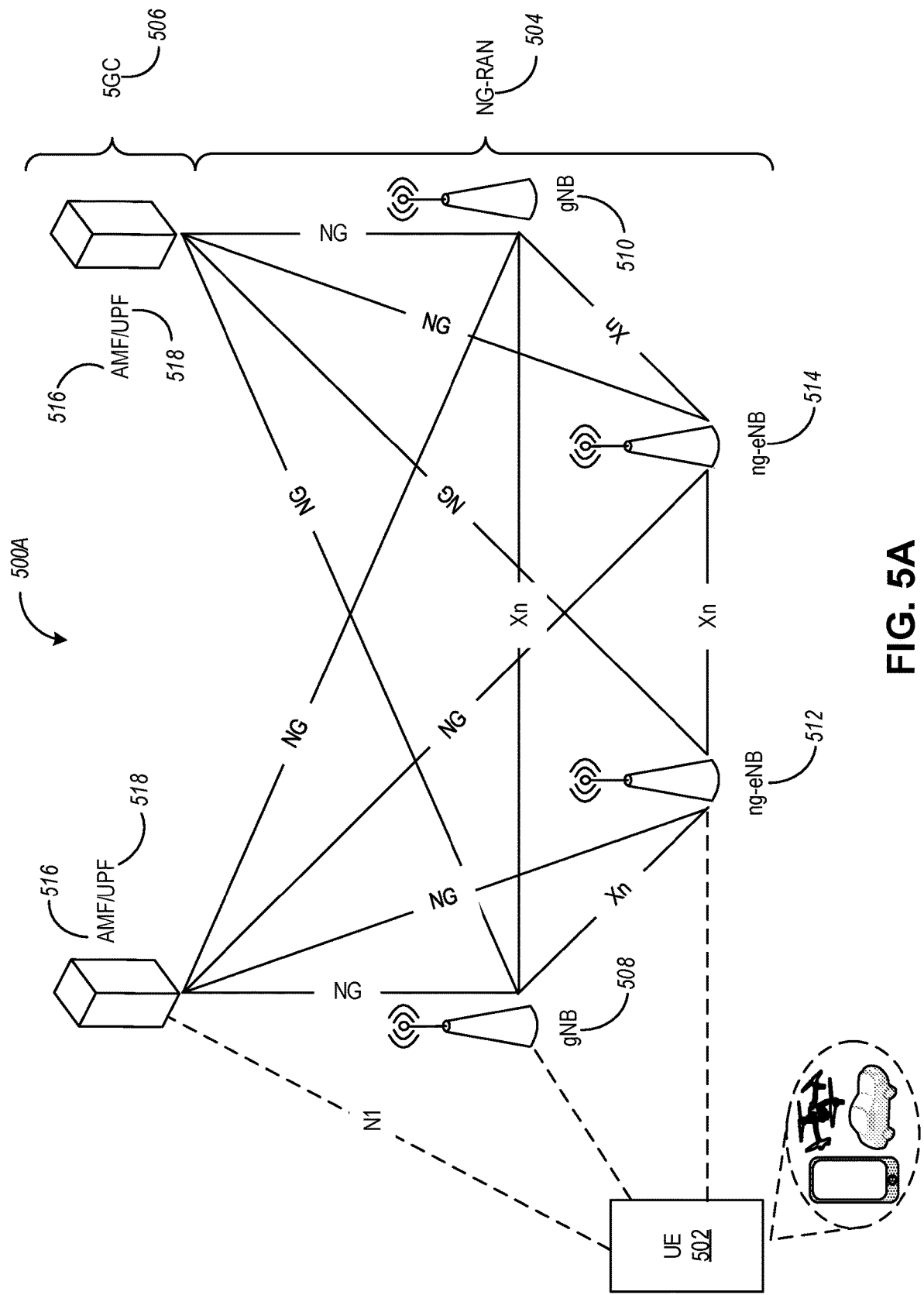
FIG. 5A is a simplified diagram of an exemplary Next-Generation (NG) system architecture, according to an example.

FIG. 5A is a simplified diagram of an exemplary Next-Generation (NG) system architecture 500A, according to an example. Referring to FIG. 5A, the NG system architecture 500A includes NG-RAN 504 and a 5G network core (5GC) 506. The NG-RAN 504 can include a plurality of NG-RAN nodes, for example, gNBs 508 and 510, and NG-eNBs 512 and 514. The gNBs 508/510 and the NG-eNBs 512/514 can be communicatively coupled to the UE 502 via a wireless connection. The core network 506 (e.g., a 5G core network or 5GC) can include an access and mobility management function (AMF) 516 or a user plane function (UPF) 518. The AMF 516 and the UPF 518 can be communicatively coupled to the gNBs 508/510 and the NG-eNBs 512/514 via NG interfaces. More specifically, in some aspects, the gNBs 508/510 and the NG-eNBs 512/514 can be connected to the AMF 516 by N2 interface, and to the UPF 518 by N3 interface. The gNBs 508/510 and the NG-eNBs 512/514 can be coupled to each other via Xn interfaces.

In some aspects, a gNB 508 can include a node providing New Radio (NR) user plane and control plane protocol termination towards the UE, and can be connected via the NG interface to the 5GC 506. In some aspects, an NG-eNB 512/514 can include a node providing evolved universal terrestrial radio access (E-UTRA) user plane and control plane protocol terminations towards the UE, and is connected via the NG interface to the 5GC 506. In some aspects, any of the gNBs 508/510 and the NG-eNBs 512/514 can be implemented as a base station (BS), a mobile edge server, a small cell, a home eNB, although aspects are not so limited. In some aspects, the UE 502 can be configured for V2X communications within the architecture 500A (as well as 500C of FIG. 5C and 500D of FIG. 5D using one or more of the techniques disclosed herein).

Figure 5B:
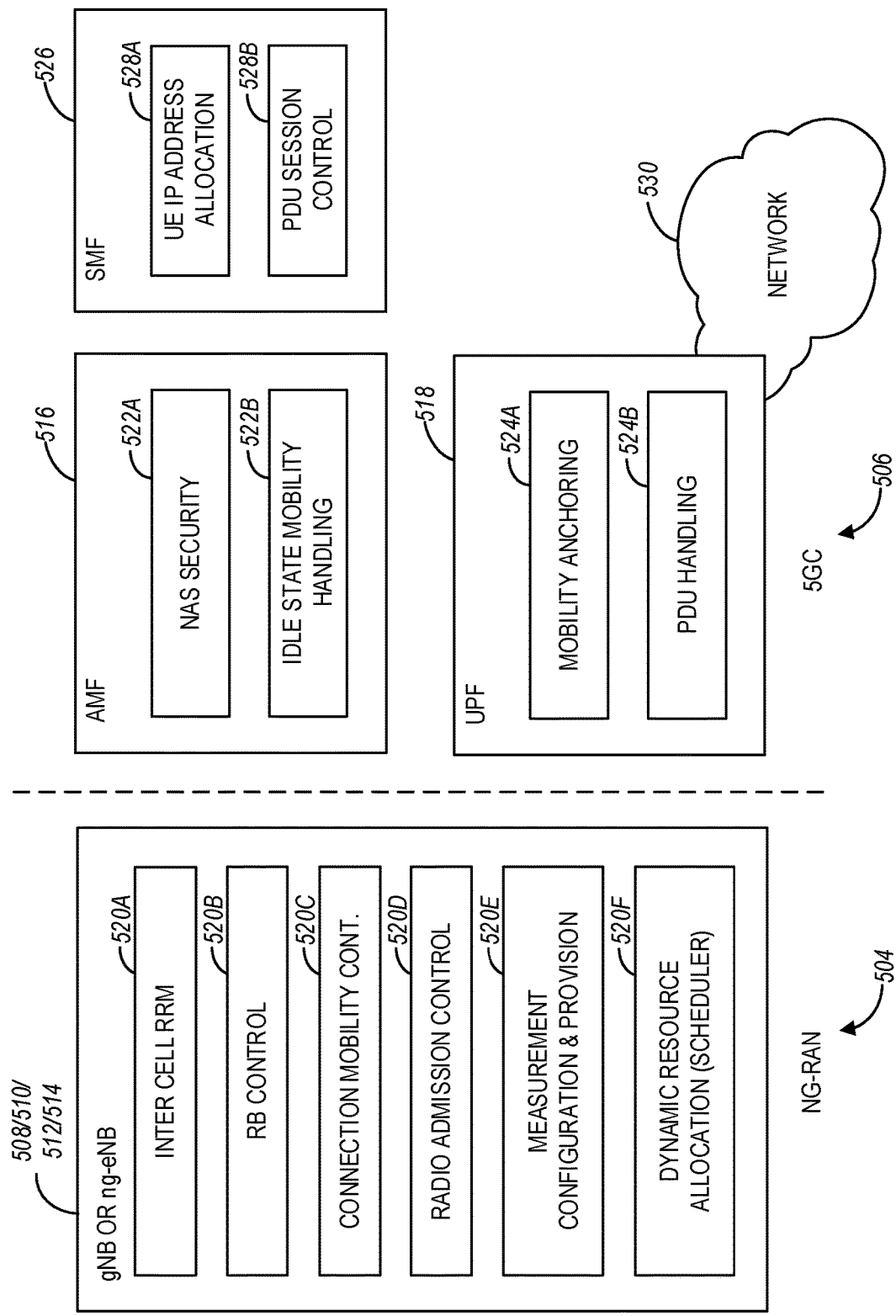
FIG. 5B illustrates an exemplary functional split between next generation radio access network (NG-RAN) and the 5G Core network (5GC), according to an example.

FIG. 5B illustrates an exemplary functional split between next generation radio access network (NG-RAN) and the 5G Core network (5GC), according to an example. FIG. 5B illustrates some of the functionalities the gNBs 508/510 and the NG-eNBs 512/514 can perform within the NG-RAN 504, as well as the AMF 516, the UPF 518, and a Session Management Function (SMF) 526 (not illustrated in FIG. 5A) within the 5GC 506. In some aspects, the 5GC 506 can provide access to a network 530 (e.g., the Internet) to one or more devices via the NG-RAN 504.

In some aspects, the gNBs 508/510 and the NG-eNBs 512/514 can be configured to host the following functions: functions for Radio Resource Management (e.g., inter-cell radio resource management 520A, radio bearer control 520B, connection mobility control 520C, radio admission control 520D, measurement and measurement reporting configuration for mobility and scheduling 520E, and dynamic allocation of resources to UEs in both uplink and downlink (scheduling) 520F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 516 can be configured to host the following functions, for example: NAS signaling termination; NAS signaling security 522A; access stratum (AS) security control; inter core network (CN) node signaling for mobility between 3GPP access networks; idle state/mode mobility handling 522B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; or SMF selection, among other functions.

The UPF 518 can be configured to host the following functions, for example: mobility anchoring 524A (e.g., anchor point for Intra-/Inter-RAT mobility); packet data unit (PDU) handling 524B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions.

The Session Management function (SMF) 526 can be configured to host the following functions, for example: session management; UE IP address allocation and management 528A; selection and control of user plane function (UPF); PDU session control 528B, including configuring traffic steering at UPF 518 to route traffic to proper destination; control part of policy enforcement and QoS; or downlink data notification, among other functions.

Figure 5C:
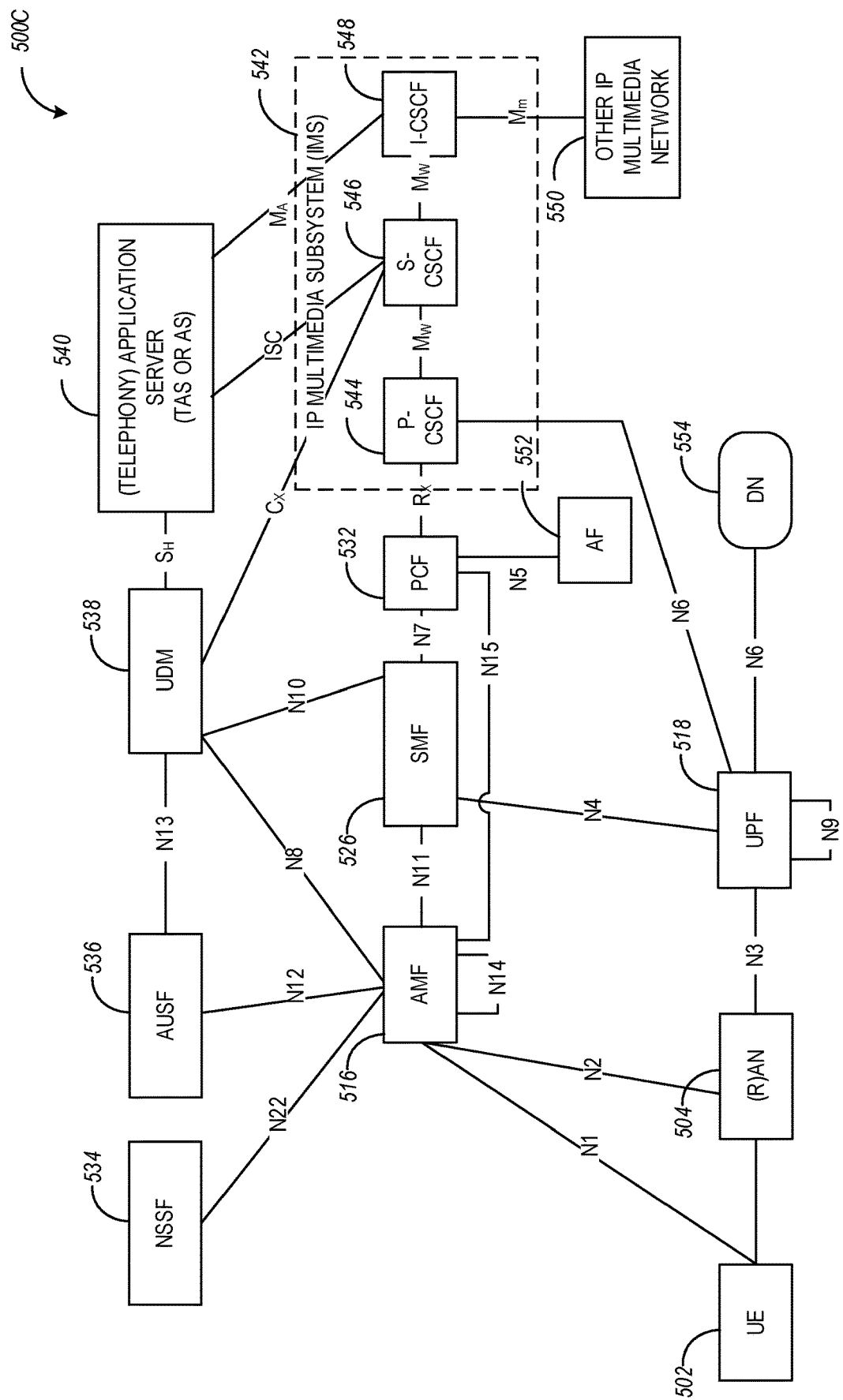
FIG. 5C illustrates an exemplary non-roaming 5G system architecture, according to an example.
Figure 5D:
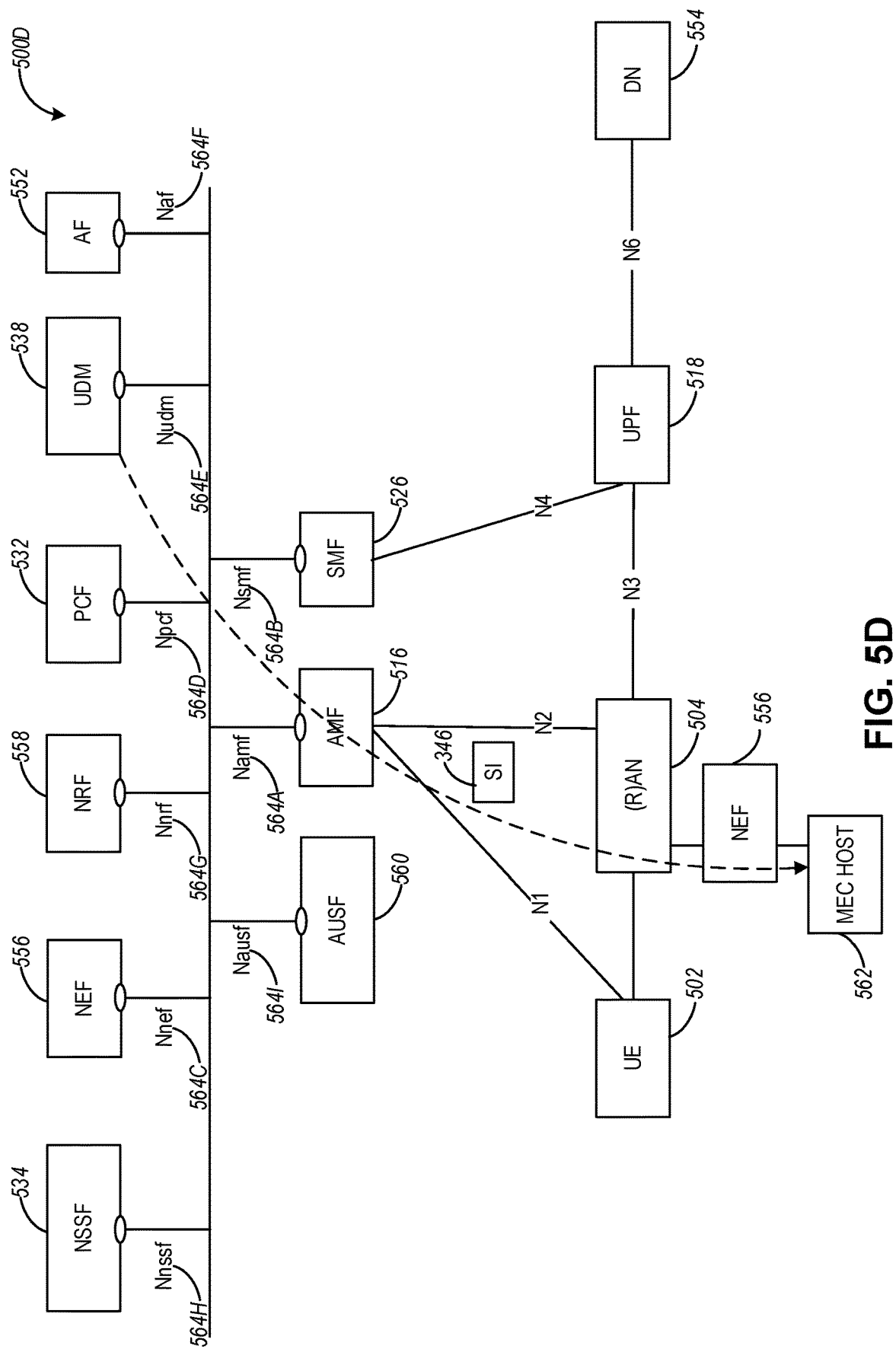
FIG. 5D illustrates an exemplary non-roaming 5G system architecture, according to an example.

FIG. 5C and FIG. 5D illustrate exemplary non-roaming 5G system architectures in accordance with some aspects. Referring to FIG. 5C, an exemplary 5G system architecture 500C in a reference point representation is illustrated. More specifically, UE 502 can be in communication with RAN 504 as well as one or more other 5G core (5GC) network entities. The 5G system architecture 500C includes a plurality of network functions (NFs), such as access and mobility management function (AMF) 516, session management function (SMF) 526, policy control function (PCF) 532, application function (AF) 552, user plane function (UPF) 518, network slice selection function (NSSF) 534, authentication server function (AUSF) 536, and unified data management (UDM) 538.

The UPF 518 can provide a connection to a data network (DN) 554, which can include, for example, operator services, Internet access, or third-party services. The AMF 516 can be used to manage access control and mobility and can also include network slice selection functionality. The SMF 526 can be configured to set up and manage various sessions according to a network policy. The UPF 518 can be deployed in one or more configurations according to a desired service type. The PCF 532 can be configured to provide a policy framework using network slicing, mobility management, and roaming (similar to PCRF in a 4G communication system). The UDM 538 can be configured to store subscriber profiles and data (similar to an HSS in a 4G communication system), such as V2X subscription information or other type of subscription information for services available within the architecture 500C.

In some aspects, the 5G system architecture 500C includes an IP multimedia subsystem (IMS) 542 as well as a plurality of IP multimedia core network subsystem entities, such as call session control functions (CSCFs). More specifically, the IMS 542 includes a CSCF, which can act as a proxy CSCF (P-CSCF) 544, a serving CSCF (S-CSCF) 546, an emergency CSCF (E-CSCF) (not illustrated in FIG. 5C), or interrogating CSCF (I-CSCF) 548. The P-CSCF 544 can be configured to be the first contact point for the UE 502 within the IMS 542. The S-CSCF 546 can be configured to handle the session states in the network, and the E-CSCF can be configured to handle certain aspects of emergency sessions such as routing an emergency request to the correct emergency center or public safety answering point (PSAP). The I-CSCF 548 can be configured to function as the contact point within an operator's network for all IMS connections destined to a subscriber of that network operator, or a roaming subscriber currently located within that network operator's service area. In some aspects, the I-CSCF 548 can be connected to another IP multimedia network 550, e.g. an IMS operated by a different network operator.

In some aspects, the UDM 538 can be coupled to an application server 540, which can include a telephony application server (TAS) or another application server (AS) including a MEC host. The AS 540 can be coupled to the IMS 542 via the S-CSCF 546 or the I-CSCF 548. In some aspects, the 5G system architecture 500C can provide V2X authorization services using one or more of the techniques described herein.

FIG. 5D illustrates an exemplary 5G system architecture 500D in a service-based representation. System architecture 500D can be substantially similar to (or the same as) system architecture 500C. In addition to the network entities illustrated in FIG. 5C, system architecture 500D can also include a network exposure function (NEF) 556 and a network repository function (NRF) 558. In some aspects, 5G system architectures can be service-based and interaction between network functions can be represented by corresponding point-to-point reference points N1 (as illustrated in FIG. 5C) or as service-based interfaces (as illustrated in FIG. 5D).

A reference point representation shows that an interaction can exist between corresponding NF services. For example, FIG. 5C illustrates the following reference points: N1 (between the UE 502 and the AMF 516), N2 (between the RAN 504 and the AMF 516), N3 (between the RAN 504 and the UPF 518), N4 (between the SMF 526 and the UPF 518), N5 (between the PCF 532 and the AF 552), N6 (between the UPF 518 and the DN 554), N7 (between the SMF 526 and the PCF 532), N8 (between the UDM 538 and the AMF 516), N9 (between two UPFs 518), N10 (between the UDM 538 and the SMF 526), N11 (between the AMF 516 and the SMF 526), N12 (between the AUSF 536 and the AMF 516), N13 (between the AUSF 536 and the UDM 538), N14 (between two AMFs 516), N15 (between the PCF 532 and the AMF 516 in case of a non-roaming scenario, or between the PCF 532 and a visited network and AMF 516 in case of a roaming scenario), N16 (between two SMFs; not shown), and N22 (between AMF 516 and NSSF 534). Other reference point representations not shown in FIG. 5C can also be used.

In some aspects, as illustrated in FIG. 5D, service-based representations can be used to represent network functions within the control plane that enable other authorized network functions to access their services. In this regard, 5G system architecture 500D can include the following service-based interfaces: Namf 564A (a service-based interface exhibited by the AMF 516), Nsmf 564B (a service-based interface exhibited by the SMF 526), Nnef 564C (a service-based interface exhibited by the NEF 556), Npcf 564D (a service-based interface exhibited by the PCF 532), Nudm 564E (a service-based interface exhibited by the UDM 538), Naf 564F (a service-based interface exhibited by the AF 552), Nnrf 564G (a service-based interface exhibited by the NRF 558), Nnssf 564H (a service-based interface exhibited by the NSSF 534), Nausf 564I (a service-based interface exhibited by the AUSF 560). Other service-based interfaces (e.g., Nudr, N5g-eir, and Nudsf) not shown in FIG. 5D can also be used.

In some aspects, the NEF 556 can provide an interface to an MEC host such as MEC host 562. In this regard, subscription information associated with the UE 502, such as subscription information 346, can be communicated from UDM 538 via the AMF 516, RAN 504, and NEF 556 to the MEC host 562 four purposes of performing a V2X authorization as disclosed herein.

Figure 6:
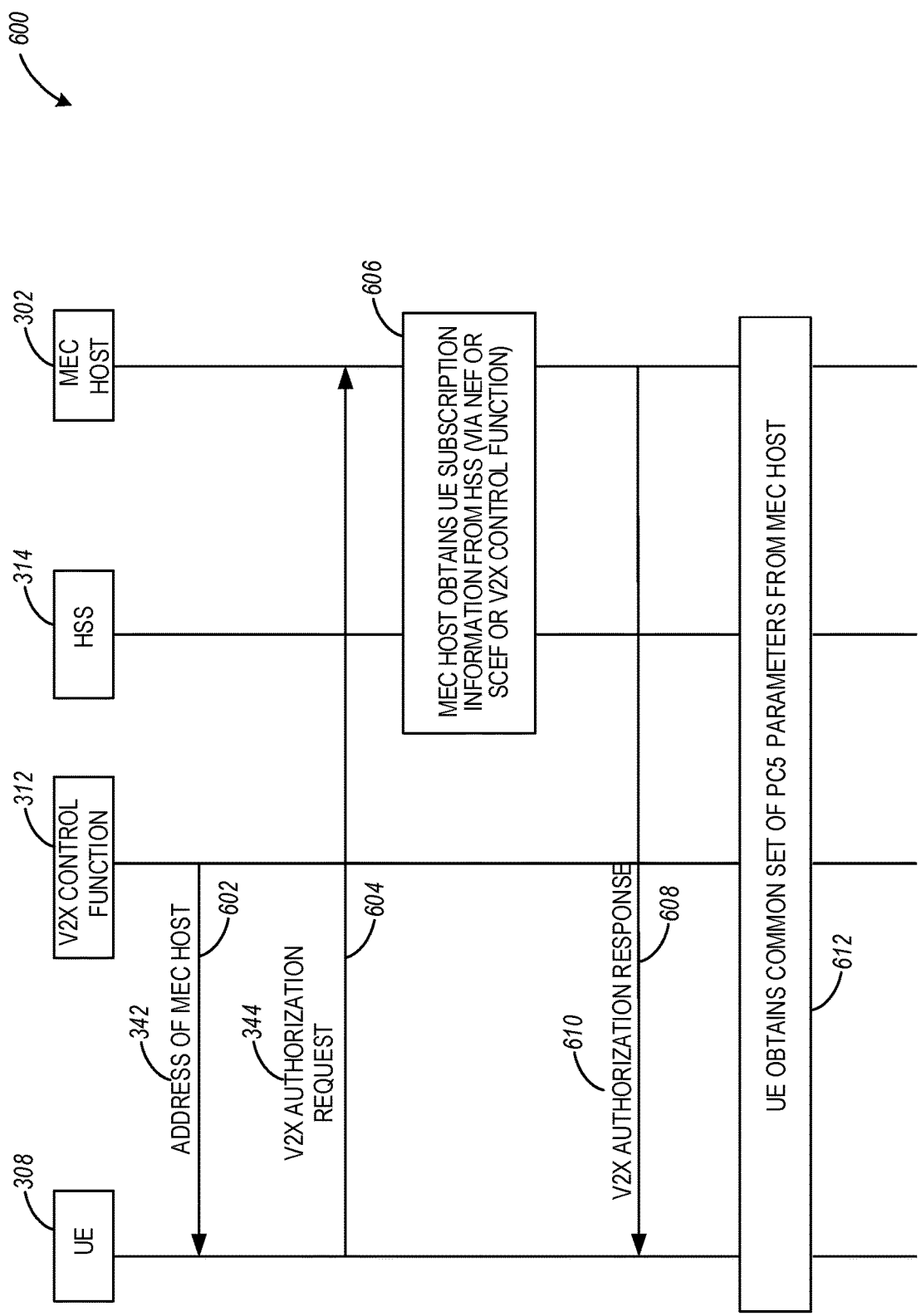
FIG. 6 illustrates a message sequence chart for performing a V2X authorization in a MEC host, according to an example.

FIG. 6 illustrates a message sequence chart 600 for performing a V2X authorization in a MEC host, according to an example. Referring to FIG. 6, the message sequence chart 600 can be performed by entities as discussed in connection with FIG. 3, such as UE 308, V2X control function 312, HSS 314, and MEC host 302. At operation 602, the network address 342 of the MEC host 302 can be communicated to the UE 308 from the V2X control function 312. At operation 604, a V2X authorization request 344 can be communicated by the UE 308 to the MEC host 302 using the network address 342. At operation 606, the MEC host 302 can obtain UE subscription information 346 (e.g., subscription information associated with V2X communications) from the HSS 314 (e.g., via NEF as illustrated in FIG. 5D, via SCEF as illustrated in FIG. 4A, or via the V2X control function 312). During operation 606, the relevant UE subscription information can be obtained via a MEC V2X API within the MEC host 302.

At operation 608, an authorization response 610 can be communicated back from the MEC host 302 to the UE 308. The authorization response 610 can indicate whether the authorization request 344 has been approved or denied based on the UE subscription information. Upon a successful authorization, at operation 612, UE 308 can obtain a common set of V2X configuration parameters (e.g., PC5 configuration parameters) from the MEC host 302. The common set of PC5 parameters may optionally be included in the Authorization Response message 610. The UE 308 can use the V2X configuration parameters to establish a V2X communication link with UE 326, which can include a link using a PC5 interface.

Figure 7:
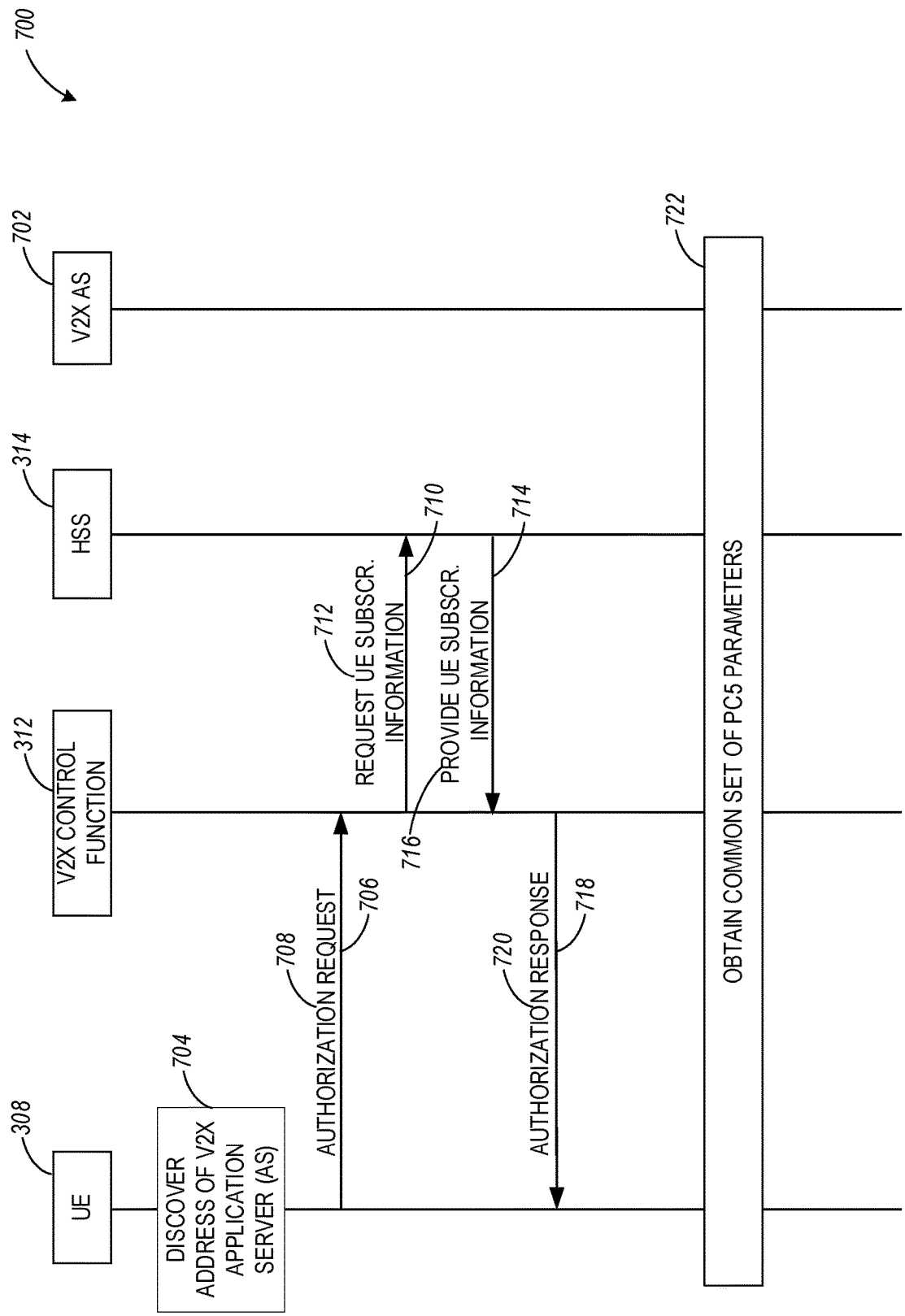
FIG. 7 illustrates a message sequence chart for performing a V2X authorization by a V2X control function in a core network, according to an example.

In some aspects and as illustrated in FIG. 7, functionality is performed by a V2X control function (e.g., as performed within a 3GPP domain) can be logically split so that some V2X related functionalities (e.g., obtaining a common set of V2X configuration parameters) can be partially offloaded to the V2X application function (e.g., residing in a V2X application server outside the 3GPP domain). The V2X control function inside the 3GPP domain can still perform the following actions: authorizing the UE to use V2X services based on HSS information (e.g., subscription information received from HSS via a V4 interface) and assist the UE in obtaining the address of the V2X application server. The entity/function outside of the 3GPP domain (e.g., the V2X application function running in the V2X application server) can be responsible for providing V2X configuration parameters, such as a common set of PC5 parameters (i.e., PC5 parameters that are common for PLMN A and PLMN B as determined based on functionalities described in connection with FIG. 8 in FIG. 9).

FIG. 7 illustrates a message sequence chart 700 for performing a V2X authorization by a V2X control function in a core network, according to an example. Referring to FIG. 7, the message sequence chart 700 can be performed by some of the entities as discussed in connection with FIG. 3, such as UE 308, V2X control function 312, HSS 314, and a V2X application server 702. The V2X application server can implement a V2X application function, which can be used to perform V2X configuration related functionalities, such as providing a common set of V2X configuration parameters to UEs authorized for V2X communications. In some aspects, the V2X application server can be the MEC host 302, which can be running a MEC application performing V2X application functions.

At operation 704, the network address of the V2X application server 702 can be discovered by the UE 308. For example, UE 308 can receive higher layer signaling indicating the server address or the server address can be provided by the core network via the V2X control function 312. At operation 706, a V2X authorization request 708 can be communicated by the UE 308 to the V2X control function 312. At operation 710, the V2X control function 312 can send a request 712 for UE subscription information to the HSS 314. At operation 714, HSS 314 can communicate back UE subscription information 716 in response to the request 712. At operation 718, the V2X control function 312 can communicate an authorization response 720 back to the UE 308. In some aspects, the authorization response 720 can also be communicated to the V2X application server 702. At operation 722, based on the authorization response 720, V2X configuration parameters can be communicated to the UE 308 for configuring a V2X communication link with another UE. In some aspects, the V2X configuration parameters can include a set of PC5 parameters that is common to multiple PLMNs (e.g., PLMN A of UE 308 and PLMN B of UE 326) and can be used for establishing a PC5 communication link between UEs 308 and 326. The common set of V2X configuration parameters can be communicated to the UE from the V2X application server 702, based on the authorization response 720.

Figure 8:
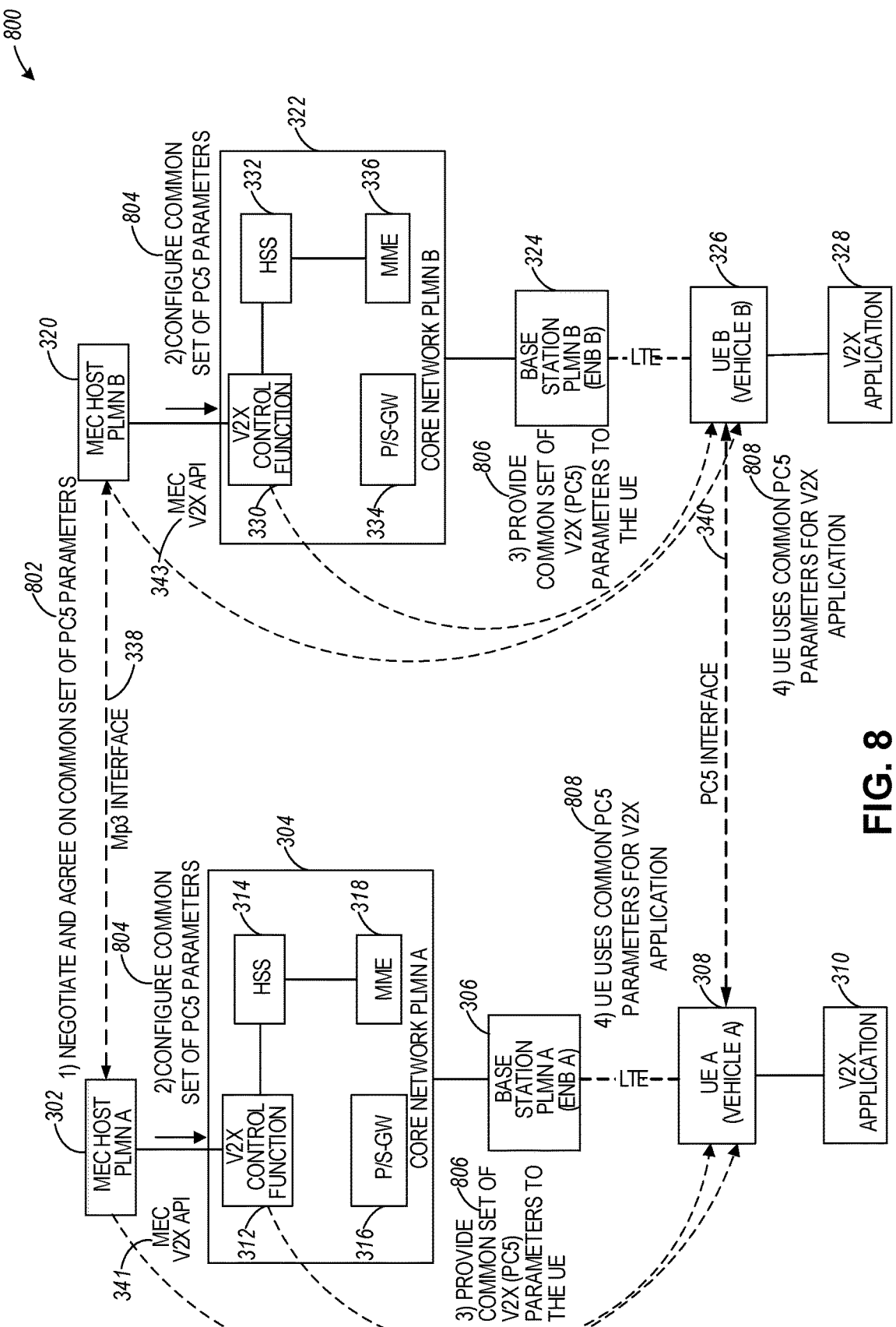
FIG. 8 illustrates negotiation of a common set of V2X configuration parameters between two MEC hosts, according to an example.

FIG. 8 illustrates negotiation of a common set of V2X configuration parameters between two MEC hosts, according to an example. Referring to FIG. 8, the C-V2X communication infrastructure 800 can be similar to the C-V2X communication infrastructure 300 and can include two coverage areas (PLMN A and PLMN B) where V2X services are provided by a separate mobile operator (e.g., designating different countries or simply areas with partially overlapped coverages). PLMN A includes a MEC host 302, a core network 304, a base station (e.g., eNB) 306, and a UE 308 running a V2X application 310. The core network 304 includes a V2X control function 312, a HSS 314, a PGW/SGW 316, and a MME 318, which can perform functionalities performed by any of the V2X control function, HSS, PGW/SGW, and MME described in connection with any of the preceding figures. The second PLMN B includes a MEC host 320, a core network 304, a base station (e.g., eNB) 306, and a UE 308 running a V2X application 310. The core network 322 includes a V2X control function 330, a HSS 332, a PGW/SGW 334, and a MME 336.

V2X configuration parameters used within each of the PLMNs A and B can be different, in which case UEs from different PLMNs cannot communicate with each other directly via PC5 interface. In some aspects, a common set of V2X configuration parameters can be configured and provisioned within both PLMN A and PLMN B for use by UEs when establishing V2X communications. More specifically, at operation 802, MEC hosts 302 and 320 can exchange V2X configuration parameters via the communication link 338. In some aspects, the V2X configuration parameters can be exchanged using the MEC V2X APIs 341 and 343 as well as the communication link 338 between the hosts. In some aspects, communication link 338 can include a Mp3 interface which can be an ETSI MEC interface. The MEC hosts 302 and 320 can negotiate a common set of V2X configuration parameters based on, e.g., network latency, bandwidth, QOS requirements, and other characteristics associated with both PLMN A and PLMN B.

At operation 804, the common set of V2X configuration parameters can be provisioned to the core networks 304 and 322 via, e.g., the MEC V2X APIs 341 and 343. In some aspects, the MEC V2X APIs 341 and 343 can provide a connection between the MEC hosts 302 and 322 the corresponding V2X control functions 312 and 330. At operation 806, the common set of V2X configuration parameters can be provided to the corresponding UEs 308 and 326. In some aspects, the common set of V2X configuration parameters can be provided from the MEC host to the UE or from the V2X control function to the UE upon successful V2X authorization of the UE, as described herein above. At operation 808, UEs 308 and 326 can use the common set of V2X configuration parameters to establish V2X communication link 340, which can be based on a PC5 interface.

Figure 9:
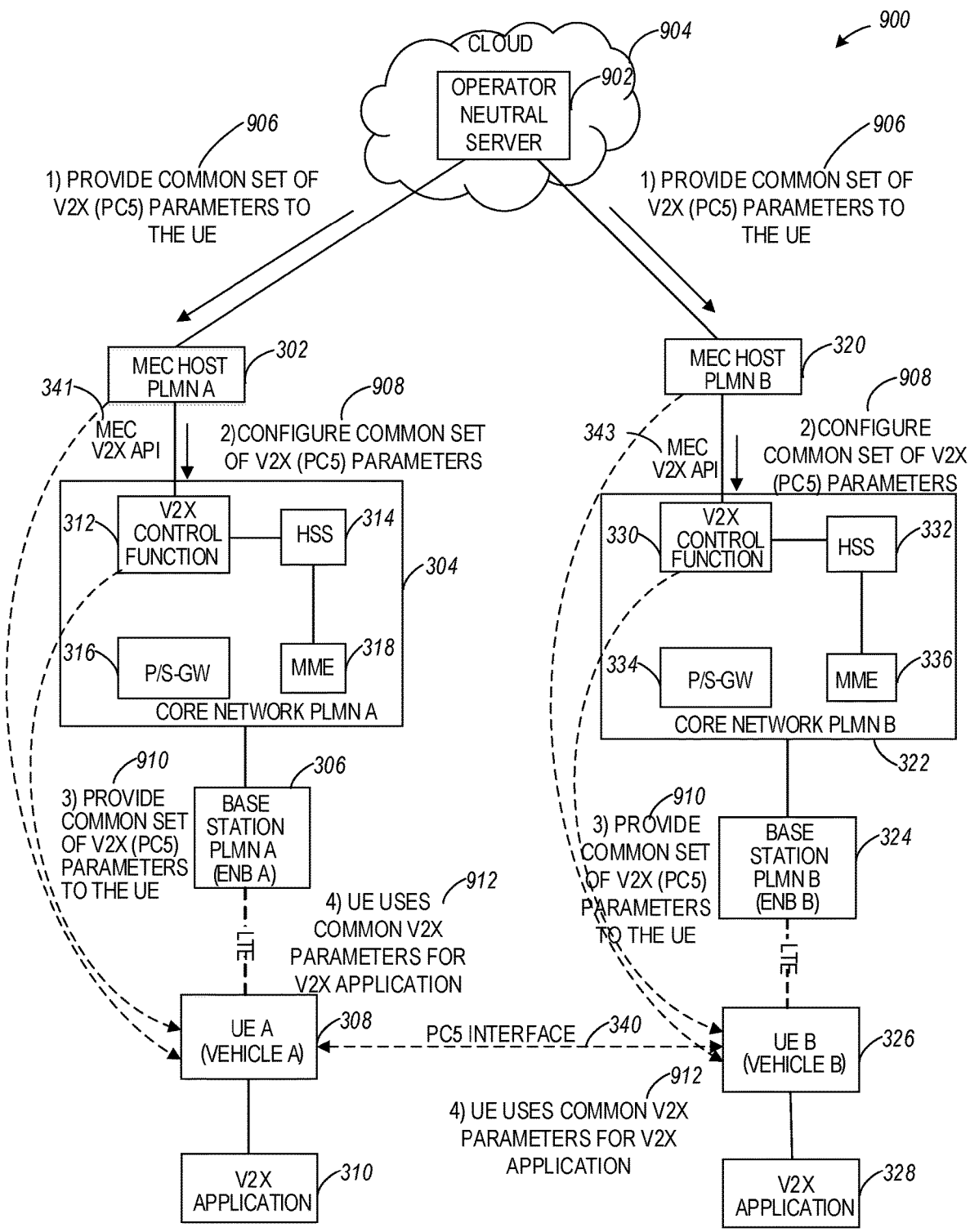
FIG. 9 illustrates negotiation of a common set of V2X configuration parameters via a neutral server, according to an example.

FIG. 9 illustrates negotiation of a common set of V2X configuration parameters via a neutral server, according to an example. Referring to FIG. 9, the C-V2X communication infrastructure 900 can be similar to the C-V2X communication infrastructure 300 and can include two coverage areas (PLMN A and PLMN B) where V2X services are provided by different mobile operators in the same geographical area (e.g., designating different countries or simply areas with partially overlapped coverages). The first PLMN A includes a MEC host 302, a core network 304, a base station (e.g., eNB) 306, and a UE 308 running a V2X application 310. The core network 304 includes a V2X control function 312, a HSS 314, a PGW/SGW 316, and a MME 318, which can perform functionalities performed by any of the V2X control function, HSS, PGW/SGW, and MME described in connection with any of the preceding figures. The second PLMN B includes a MEC host 320, a core network 304, a base station (e.g., eNB) 306, and a UE 308 running a V2X application 310. The core network 322 includes a V2X control function 330, a HSS 332, a PGW/SGW 334, and a MME 336.

V2X configuration parameters used within each of the PLMNs A and B can be different. In some aspects, a common set of V2X configuration parameters can be configured by a PLMN-neutral server and provisioned within both PLMN A and PLMN B by the neutral server for use by UEs when establishing V2X communications. For example, an operator neutral server 902 within network 904 can generate a common set of V2X configuration parameters for use by mobile services operators associated with different PLMNs.

At operation 906, the operator neutral server 902 can communicate the common set of V2X configuration parameters to MEC hosts 302 and 320 via communication links 914 and 916. In some aspects, the common set of V2X configuration parameters can be received via the MEC V2X APIs 341 and 343.

At operation 908, the common set of V2X configuration parameters can be provisioned to the core networks 304 and 322 via, e.g., the MEC V2X APIs 341 and 343. In some aspects, the MEC V2X APIs 341 and 343 can provide a connection between the MEC hosts 302 and 322 the corresponding V2X control functions 312 and 330. At operation 910, the common set of V2X configuration parameters can be provided to the corresponding UEs 308 and 326. In some aspects, the common set of V2X configuration parameters can be provided from the MEC host to the UE or from the V2X control function to the UE upon successful V2X authorization of the UE. At operation 912, UEs 308 and 326 can use the common set of V2X configuration parameters to establish V2X communication link 340, which can be based on a PC5 interface.

Figure 10:
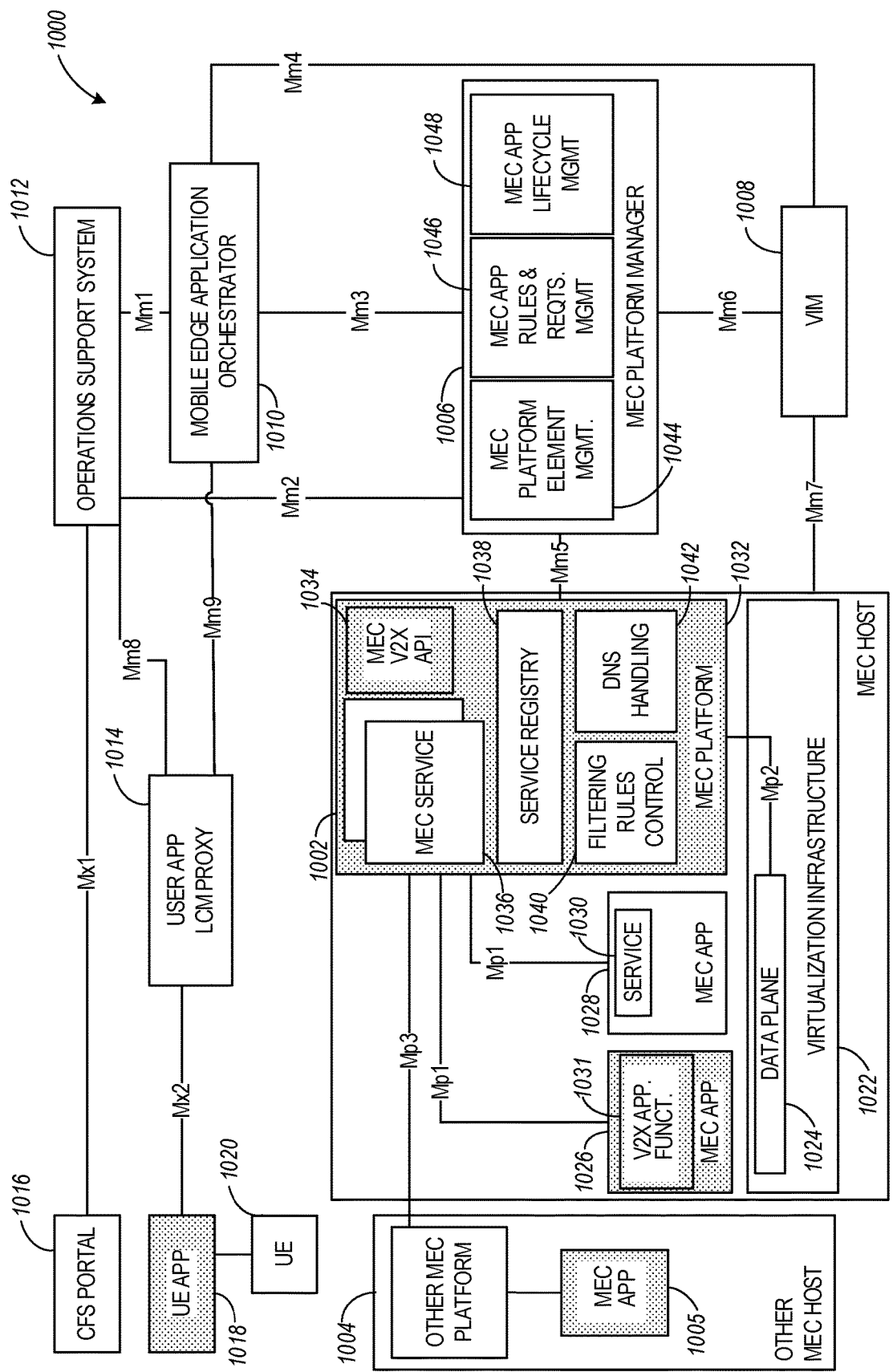
FIG. 10 illustrates a MEC network architecture modified for supporting V2X authorizations using a MEC V2X API, according to an example.

FIG. 10 illustrates a MEC network architecture modified for supporting V2X authorizations using a MEC V2X API, according to an example. FIG. 10 specifically illustrates a MEC system (in accordance with the ETSI GS MEC-003 specification), with shaded blocks used to indicate processing aspects for the MEC architecture configuration described above. Specifically, enhancements to the UE app 1018 and the MEC platform 1032 of MEC host 1002 may be used for multi-operator support in C-V2X architectures (e.g., to authorize and configure V2X communications). This may include the definition of functions, interfaces, data values, and operational requirements to support V2X authorization and configuration among any of these MEC processing entities.

Referring to FIG. 10, the MEC network architecture 1000 can include MEC hosts 1002 and 1004, a virtualization infrastructure manager (VIM) 1008, a MEC platform manager 1006, a MEC orchestrator 1010, and operations support system 1012, a user app proxy 1014, a UE app 1018 running on UE 1020, and CFS portal 1016. The MEC host 1002 can include a MEC platform 1032 with filtering roles control module 1040, DNS handling module 1042, service registry 1038, and MEC services 1036. The MEC platform 1032 can instantiate MEC apps 1026 and 1028, with MEC app 1028 providing one or more services 1030. The MEC platform manager 1006 can include MEC platform element management module 1044, MEC app rules and requirements management module 1046, and MEC app lifecycle management module 1048. The functionalities of the various entities within the MEC architecture 1000 can perform functionalities as disclosed by the ETSI GS MEC-003 specification.

In some aspects, the ME app 1026 within MEC host 1002 can be instantiated to perform functionalities of a V2X application function 1031, such as described in connection with FIG. 13. Additionally, MEC hosts 1002, 1004 can use MEC V2X APIs (e.g., API 1034 in MEC host 1002) to perform functions as described in connection with FIG. 13.

Figure 11:
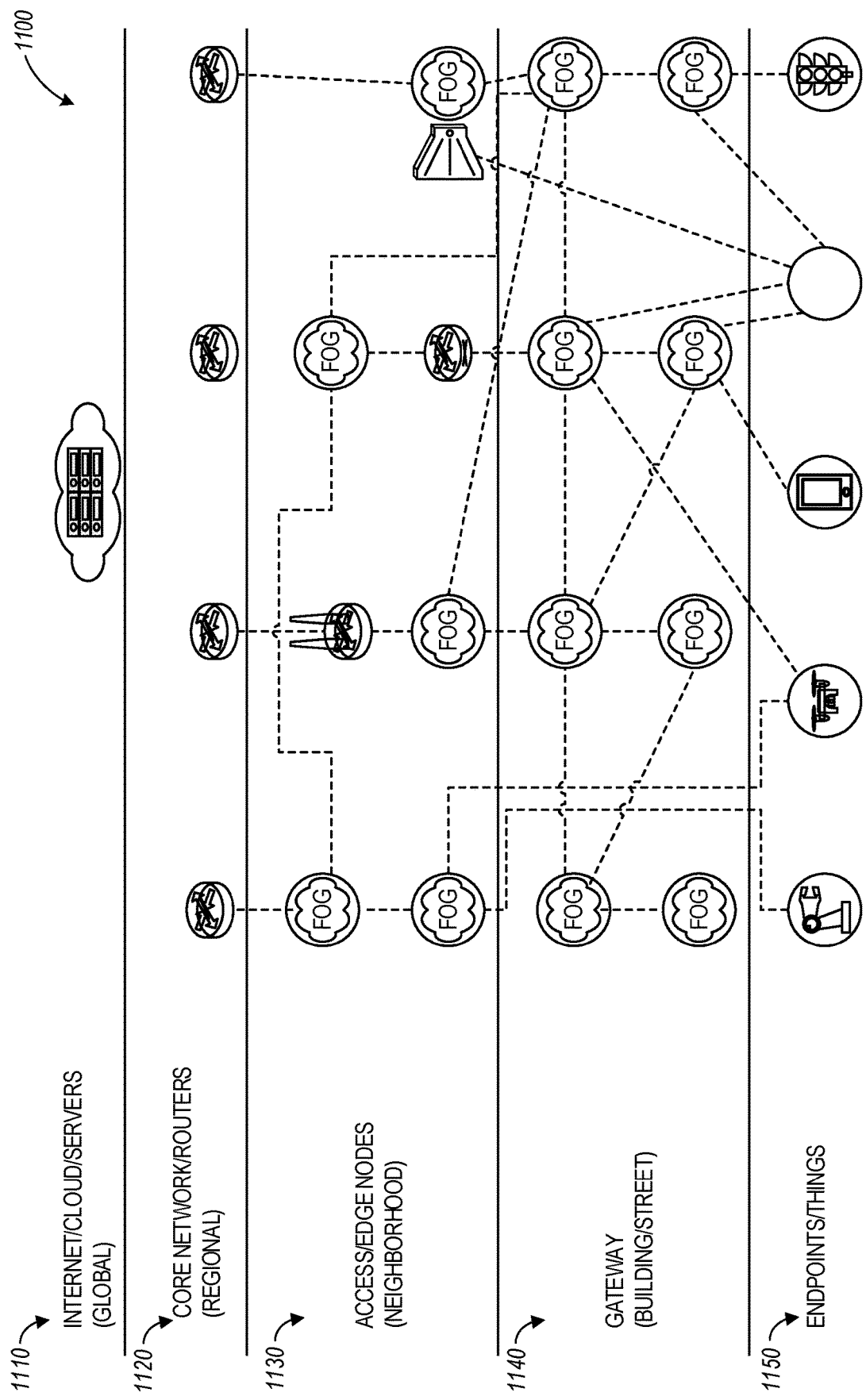
FIG. 11 illustrates a MEC and FOG network topology, according to an example.

FIG. 11 illustrates a MEC and FOG network topology 1100, according to an example. Referring to FIG. 11, the network topology 1100 can include a number of conventional networking layers, may be extended through use of MEC V2X APIs discussed herein. Specifically, the relationships between endpoints (at endpoints/things network layer 1150), gateways (at gateway layer 1140), access or edge computing nodes (e.g., at neighborhood nodes layer 1130), core network or routers (e.g., at regional or central office layer 1120), may be represented through the use of data communicated via MEC V2X APIs located at various nodes within the topology 1100.

A FOG network (e.g., established at gateway layer 1140) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 11 illustrates a general architecture that integrates a number of MEC and FOG nodes— categorized in different layers (based on their position, connectivity and processing capabilities, etc.), with each node implementing a MEC V2X API that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated to a MEC host in the system. The nodes may be migrated, associated to different MEC hosts, or consume MEC services from other (e.g., local or remote) MEC platforms.

In contrast to this approach, traditional V2V applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street.

In some aspects, the MEC or FOG facilities can be used to locally create, maintain, and destroy MEC or FOG nodes to host data exchanged via the MEC V2X APIs, based upon need. Depending on the real-time requirements in a vehicular communications context, a hierarchical structure of data processing and storage nodes can be defined. For example, including local ultra-low-latency processing, regional storage and processing as well as remote cloud data-center based storage and processing. Key Performance Indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. In some aspects, the KPIs are metrics or operational parameters that can include spatial proximity to a V2X-related target event (e.g., accident, etc.); physical proximity to other objects (e.g., how much time is required to transfer data from one data or application object to another object); available processing power; or current load of the target (network) node and corresponding processing latency. In some aspects, the KPIs can be used to facilitate automated location and relocation of data in a V2X architecture.

Figure 12:
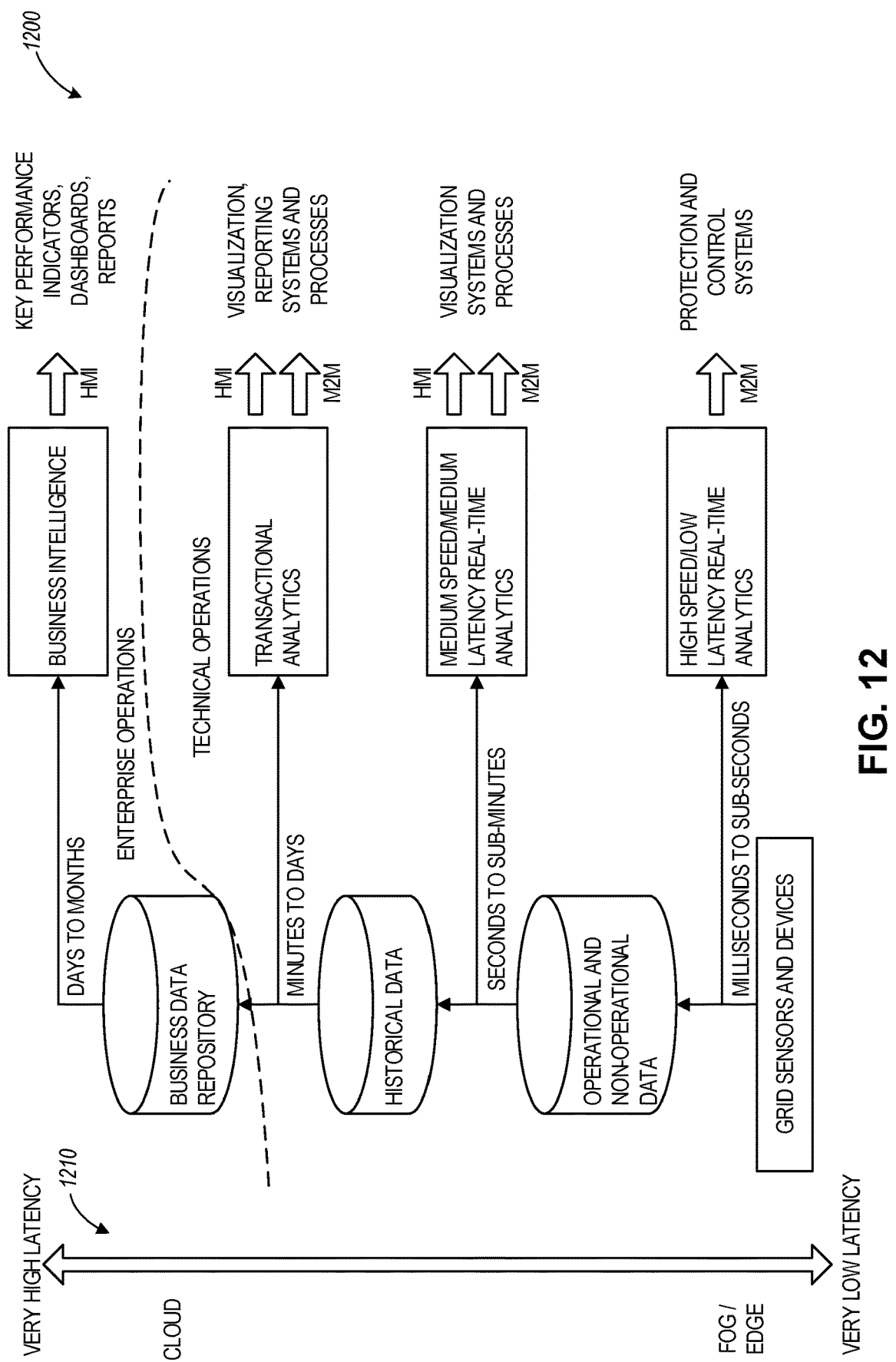
FIG. 12 illustrates processing and storage layers in a MEC and FOG network, according to an example.

FIG. 12 illustrates processing and storage layers in a MEC and FOG network 1200, according to an example. The illustrated data storage or processing hierarchy 1210 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 13:
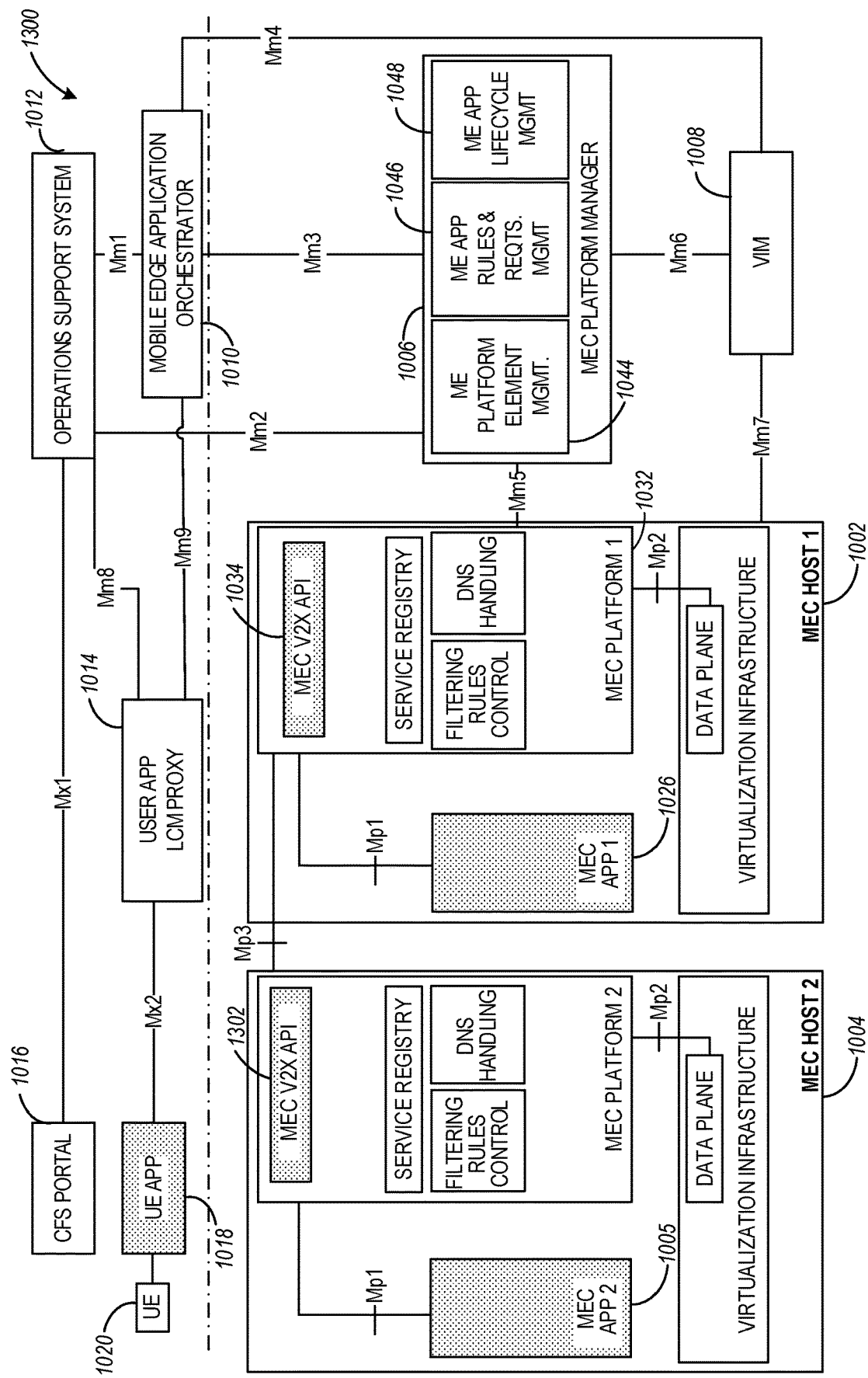
FIG. 13 illustrates a MEC architecture with multiple MEC hosts supporting V2X authorizations using MEC V2X APIs, according to example.

FIG. 13 illustrates a MEC architecture 1300 with multiple MEC hosts supporting V2X authorizations using MEC V2X APIs, according to example. Referring to FIG. 13, the MEC architecture 1300 can include similar components to the MEC architecture 1000 of FIG. 10. FIG. 13 illustrates logical connections between various entities of the MEC architecture 1300, which architecture is access-agnostic and not dependent on a particular deployment. In some aspects, MEC app 1026 can be instantiated within MEC host 1002 to perform functionalities associated with a V2X application function (e.g., 1031 in FIG. 10). In some aspects, MEC app 1026 can be configured to perform the following V2X application functions: obtaining V2X subscription information for a UE, determining whether the UE is authorized to perform V2X communications in response to a request for V2X services, communicating V2X configuration parameters such as a common set of V2X configuration parameters, and so forth.

In some aspects, the MEC platform 1032 can include a MEC V2X API 1034, which can be used to perform the following functionalities: (a) gathering of V2X relevant information from the 3GPP network for purposes of performing UE authorization for V2X communications (e.g., obtaining a list of V2X authorized UEs, obtaining relevant information about the authorization based on the UE subscription, and obtaining V2X configuration parameters such as a common set of V2X configuration parameters which can include PC5 configuration parameters); (b) exposure of the information obtained in (a) to MEC apps in the same host or MEC apps in other MEC hosts; (c) enablement of MEC apps to communicate securely with the V2X-related 3GPP core network logical functions (e.g., enabling communication between the MEC host and a V2X control function in the core network); (d) enablement of MEC apps in different MEC systems to communicate securely with each other; and (e) gathering and processing information available in other MEC APIs (e.g., gathering and processing information obtained from a Radio Network Information (RNI) API, Location API, WLAN API, and other APIs that may be implemented within the MEC platform 1032) in order to predict radio network congestion, and provide suitable notifications to the UE.

In some aspects, the second MEC host 1004 can also implement a MEC V2X API 1302 which can provide an interface to one or more of the apps instantiated within host 1004, such as MEC app 1005. In this regard, hosts 1004 and 1002 can communicate with each other via the MP3 interface as well as the MEC V2X APIs 1302 and 1034. Additionally, one or more of the apps instantiated within host 1002 can communicate with one or more of the apps instantiated within host 1004 via the MEC V2X APIs 1302 and 1034 as well as the interface between the hosts 1004 and 1002.

In some aspects, each of the MEC hosts 1002 and 1004 can be owned/managed by a different mobile services operator (while it can be operated directly by a MEC vendor or a third party). In some aspects, MEC applications instantiated on hosts 1002 and 1004 can be used to provide V2X-related services, and can be operated by the mobile services operator, by a MEC vendor, or by a third party (e.g. OEM, or OEM supplier, or system integrator).

In some aspects, the MEC V2X APIs 1034 and 1302 can be provided as a general middleware service, providing information gathered from vehicles and other V2X elements, and exposed as a service within the hosts (i.e., as a RESTful API) for the higher layers (e.g., the MEC apps instantiated within the hosts). In some aspects, the MEC V2X APIs and 34 and 1302 can be configured to gather information and data from sensors. In this regard, the deployment of the MEC V2X APIs is ensuring continuity of the service across different mobile networks, for the same OEM (e.g., automobile manufacturer). If a standard implementation of a V2X API is introduced (e.g. by ETSI MEC), this functionality can ensure the same basic V2X service characteristics for all OEMs in a 5G communication system with MEC functionalities.

In some aspects, MEC apps 1026 and 1005 can use the corresponding MEC V2X APIs to retrieve information from the 3GPP network. In some aspects, MEC apps 1026 and 1005 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 1026 can be configured to connect to MEC host 1004 (through V2X MEC API 1302 in MEC host 1004), and MEC app 1005 can be configured to connect to MEC Host 1002 (through V2X MEC API 1034 in MEC host 1002). In case of a multi-operator architecture, multiple MEC hosts can be configured to communicate with each other via the MEC V2X APIs and synchronize in order to transfer the relevant V2X configuration parameters, so that they can be available across the multi-operator architecture in absence of cellular coverage (e.g., outside of the 3GPP domain). In this way, a UE (e.g., 1020) can have access to V2X configuration parameters even when the UE is not under coverage of its 3GPP network.

Figure 14:
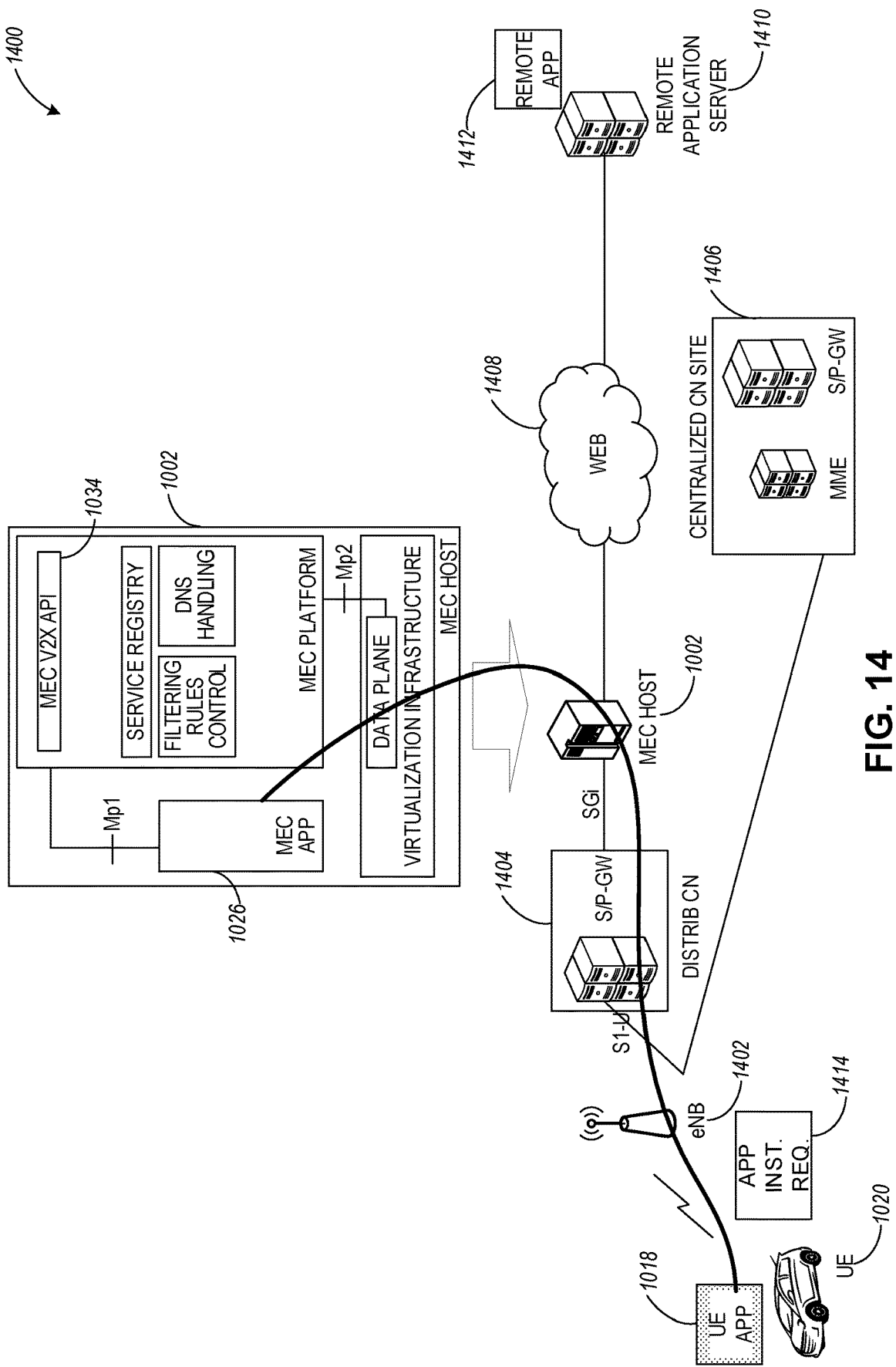
FIG. 14 illustrates an example communication between a UE application and an MEC application running on a MEC host, according to an example.

FIG. 14 illustrates an example communication between a UE application and an MEC application running on a MEC host, according to an example. Referring to FIG. 14, the MEC based communication architecture 1400 includes the MEC host 1002 coupled in a distributed core network configuration, similar to the configuration illustrated in FIG. 1C. More specifically, a UE 1020 can be coupled to a radio access network represented by eNB 1402. The eNB 1402 can be coupled to a distributed core network 1404 and a centralized core network 1406. The distributed core network 1404 can provide communication path to remote application server 1410 hosting remote applications (e.g., app 1412), via the MEC host 1002 and the network 1408.

In some aspects, UE app 1018 running on a UE 1020 (which can be located within a moving vehicle) can request instantiation of a MEC app (e.g., 1026) at MEC host 1002, for purposes of performing V2X application functionalities associated with V2X functions described herein. More specifically, the UE app 1018 can send a MEC app instantiation request 1414 to the MEC system (reached logically via Mx2 interface in the User App LCM Proxy 1014). The physical connection between UE and MEC system can be realized via the eNB 1402 the distributed core network 1404 and the SGi interface (coupling MEC host 1002 with the distributed core network 1404). The MEC app instantiation request 1414 is sent to the MEC system through the User App LCM Proxy 1014 and managed by the OSS (1012) and the MEC orchestrator (1010), depicted in FIG. 13. Instead, use traffic can be received at the MEC host 1002 via the data plane 1024 of the virtualization infrastructure 1022 (e.g., see FIG. 14). In response to request from the UE to instantiate a MEC app, the MEC orchestrator identifies a proper MEC host 1002 able to instantiate MEC app 1026 to perform V2X application functions 1031, as discussed in connection with FIG. 10 and FIG. 13. Once a MEC app is instantiated, the communication between the UE app 1018 and the MEC app is performed via the SGi interface and the distributed core network 1404. In some aspects, in lieu of direct communication between the UE app 1018 and the User App LCM Proxy 1014, the MEC app 1026 can be instantiated based on configuration (done by the network operator) triggered by the OSS 1012.

Figure 15:
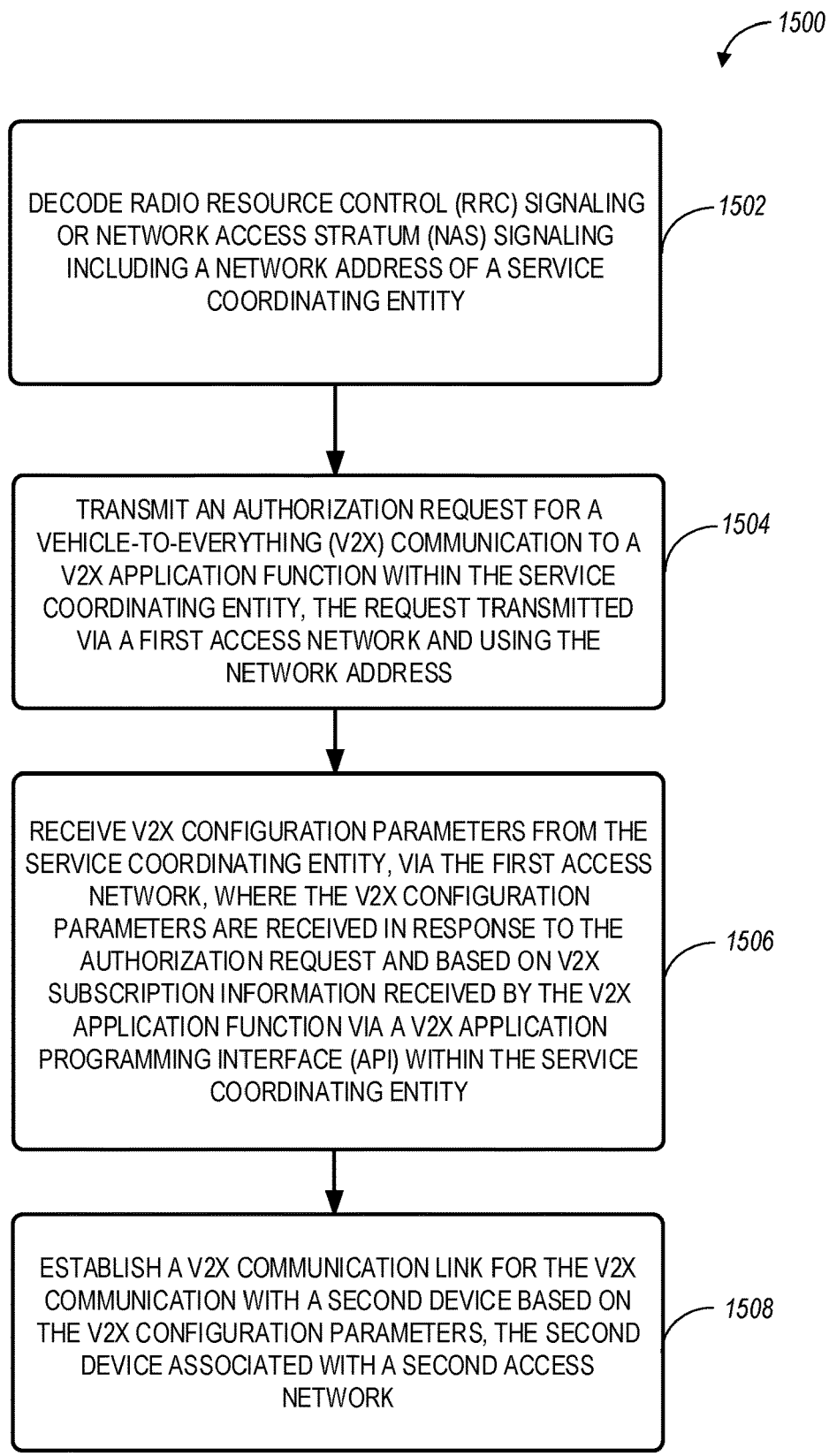
FIG. 15 illustrates a flowchart of a method for V2X communications, according to an example.

FIG. 15 illustrates a flowchart of a method 1500 for V2X communications, according to an example. The method 1500 includes operations 1502, 1504, 1506, and 1508. By way of example and not limitation, the method 1500 is described as being performed by UE device 308 or 1020 (which can be the same as IoT device 1950 of FIG. 19). At operation 1502, radio resource control (RRC) signaling or network access stratum (NAS) signaling including a network address of a service coordinating entity can be decoded. For example, UE 308 can receive signaling with address information 342 of the MEC host 302 within PLMN A. At operation 1504, an authorization request for a vehicle-to-everything (V2X) communication is transmitted to a V2X application function within the service coordinating entity, the request transmitted via a first access network and using the network address. For example, UE 308 can transmit the V2X authorization request 344 to the MEC host 302 using the address information 342, where the MEC host 302 can instantiate a MEC app (e.g., 1026) acting as a V2X application function. At operation 1506, V2X configuration parameters 348 received from the service coordinating entity (e.g., MEC host 302), via the first access network. For example, the V2X configuration parameters 348 are received from the MEC host 302 in response to the authorization request 344 and further based on V2X subscription information 346. The V2X subscription information 346 is received by the V2X application function (e.g., by the MEC app 1026 acting as a V2X application function) via a V2X application programming interface (e.g., MEC V2X API 1034) within the service coordinating entity. At operation 1508, a V2X communication link is established for the V2X communication with a second device based on the V2X configuration parameters, the second device being associated with a second access network. For example, UE 308 (in PLMN A) can establish a communication link 340 with UE 326 (in PLMN B) based on the received V2X configuration parameters 348. For example, the V2X configuration parameters 348 can include a common set of PC5 configuration parameters and the communication link 340 can be a communication link using a PC5 interface.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-

28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme by, e.g., introducing a hierarchical prioritization of usage for different types of users (e.g., low/medium/high priority, etc.), based on a prioritized access to the spectrum e.g. with highest priority to tier-1 users, followed by tier-2, then tier-3 users, and so forth.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node-Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 16:
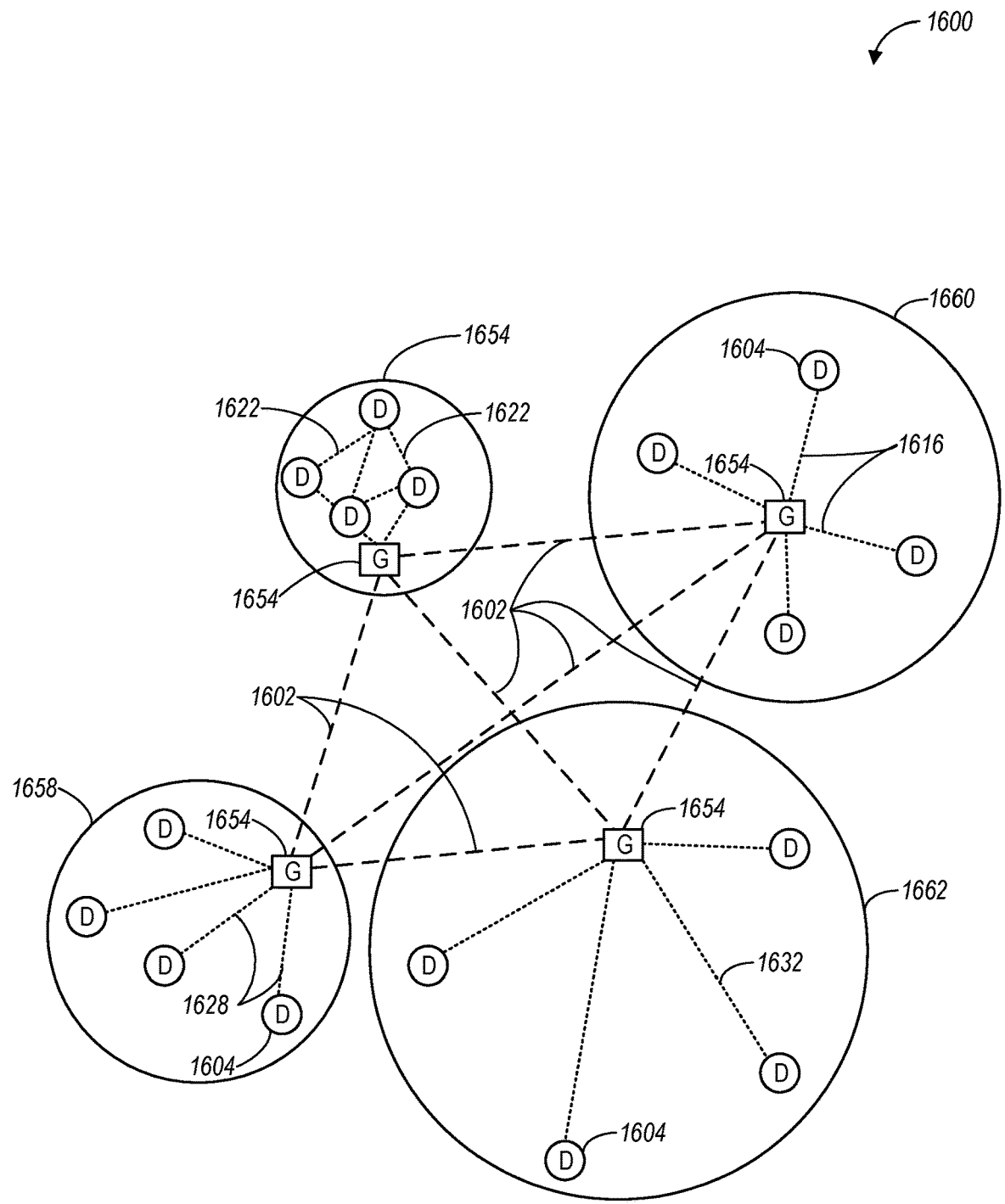
FIG. 16 illustrates a domain topology for respective internet-of-things (IoT) networks coupled through links to respective gateways, according to an example.

In further examples, the preceding examples of network communications and operations may be integrated with IoT and like device-based network architectures. FIG. 16 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real-world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 16 specifically provides a simplified drawing of a domain topology that may be used for a number of IoT networks comprising IoT devices 1604, with the IoT networks 1656, 1658, 1660, 1662, coupled through backbone links 1602 to respective gateways 1654. For example, a number of IoT devices 1604 may communicate with a gateway 1654, and with each other through the gateway 1654. To simplify the drawing, not every IoT device 1604, or communications link (e.g., link 1616, 1622, 1628, or 1632) is labeled. The backbone links 1602 may include any number of wired or wireless technologies, including optical networks, and may be part of a local area network (LAN), a wide area network (WAN), or the Internet. Additionally, such communication links facilitate optical signal paths among both IoT devices 1604 and gateways 1654, including the use of MUXing/deMUXing components that facilitate interconnection of the various devices.

The network topology may include any number of types of IoT networks, such as a mesh network provided with the network 1656 using Bluetooth low energy (BLE) links 1622. Other types of IoT networks that may be present include a wireless local area network (WLAN) network 1658 used to communicate with IoT devices 1604 through IEEE 802.11 (Wi-Fi®) links 1628, a cellular network 1660 used to communicate with IoT devices 1604 through an LTE/LTE-A (4G) or 5G cellular network, and a low-power wide area (LPWA) network 1662, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1604, such as over the backbone links 1602, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1656, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 1658, for instance, may use systems that perform standards conversion to provide multi-standard connectivity, enabling IoT devices 1604 using different protocols to communicate. Further systems may provide seamless interconnectivity across a multi-standard infrastructure comprising visible Internet resources and hidden Internet resources.

Communications in the cellular network 1660, for instance, may be enhanced by systems that offload data, extend communications to more remote devices, or both. The LPWA network 1662 may include systems that perform non-Internet protocol (IP) to IP interconnections, addressing, and routing. Further, each of the IoT devices 1604 may include the appropriate transceiver for wide area communications with that device. Further, each IoT device 1604 may include other transceivers for communications using additional protocols and frequencies. This is discussed further with respect to the communication environment and hardware of an IoT processing device depicted in FIG. 18 and FIG. 19.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 17 below.

Figure 17:
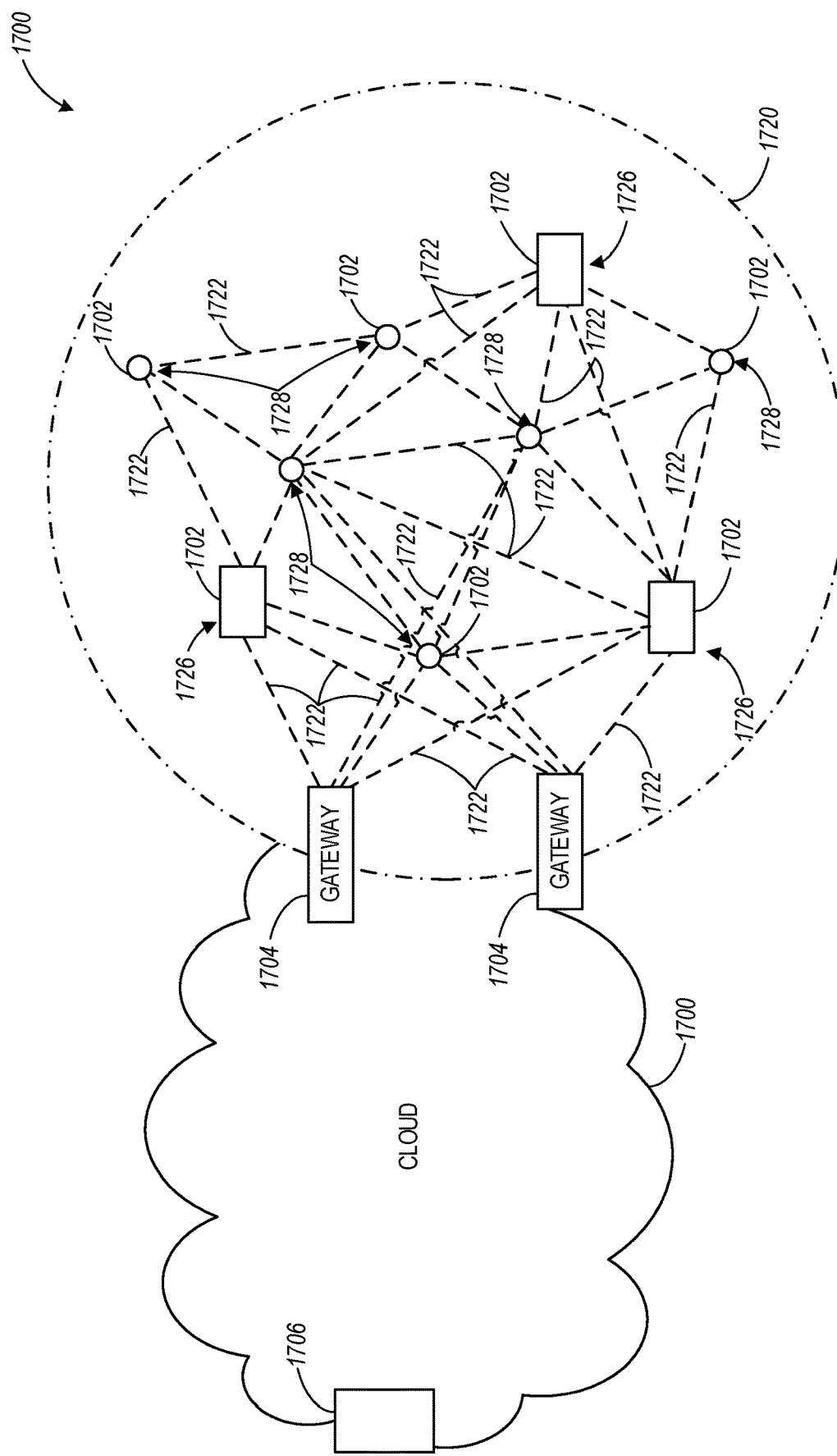
FIG. 17 illustrates a cloud-computing network in communication with a mesh network of IoT/endpoint devices operating as a fog device at the edge of the cloud-computing network, according to an example.

FIG. 17 illustrates a cloud computing network in communication with a mesh network of IoT devices (devices 1702) operating as a fog platform in a networked scenario. The mesh network of IoT devices may be termed a fog network 1720, established from a network of devices operating at the edge of the cloud 1700. To simplify the diagram, not every IoT device 1702 is labeled.

The fog network 1720 may be considered to be a massively interconnected network wherein a number of IoT devices 1702 are in communications with each other, for example, by radio links 1722. The fog network 1720 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1720 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1702 are shown in this example, gateways 1704, data aggregators 1726, and sensors 1728, although any combinations of IoT devices 1702 and functionality may be used. The gateways 1704 may be edge devices that provide communications between the cloud 1700 and the fog 1720 and may also provide the backend process function for data obtained from sensors 1728, such as motion data, flow data, temperature data, and the like. The data aggregators 1726 may collect data from any number of the sensors 1728 and perform the back-end processing function for the analysis. The results, raw data, or both may be passed along to the cloud 1700 through the gateways 1704. The sensors 1728 may be full IoT devices 1702, for example, capable of both collecting data and processing the data. In some cases, the sensors 1728 may be more limited in functionality, for example, collecting the data and enabling the data aggregators 1726 or gateways 1704 to process the data.

Communications from any IoT device 1702 may be passed along a convenient path (e.g., a most convenient path) between any of the IoT devices 1702 to reach the gateways 1704. In these networks, the number of interconnections provide substantial redundancy, enabling communications to be maintained, even with the loss of a number of IoT devices 1702. Further, the use of a mesh network may enable IoT devices 1702 that are very low power or located at a distance from infrastructure to be used, as the range to connect to another IoT device 1702 may be much less than the range to connect to the gateways 1704.

The fog 1720 provided from these IoT devices 1702 may be presented to devices in the cloud 1700, such as a server 1706, as a single device located at the edge of the cloud 1700, e.g., a fog device. In this example, the alerts coming from the fog device may be sent without being identified as coming from a specific IoT device 1702 within the fog 1720. In this fashion, the fog 1720 may be considered a distributed platform that provides computing and storage resources to perform processing or data-intensive tasks such as data analytics, data aggregation, and machine-learning, among others.

In some examples, the IoT devices 1702 may be configured using an imperative programming style, e.g., with each IoT device 1702 having a specific function and communication partners. However, the IoT devices 1702 forming the fog device may be configured in a declarative programming style, enabling the IoT devices 1702 to reconfigure their operations and communications, such as to determine needed resources in response to conditions, queries, and device failures. As an example, a query from a user located at a server 1706 about the operations of a subset of equipment monitored by the IoT devices 1702 may result in the fog 1720 device selecting the IoT devices 1702, such as particular sensors 1728, needed to answer the query. The data from these sensors 1728 may then be aggregated and analyzed by any combination of the sensors 1728, data aggregators 1726, or gateways 1704, before being sent on by the fog 1720 device to the server 1706 to answer the query. In this example, IoT devices 1702 in the fog 1720 may select the sensors 1728 used based on the query, such as adding data from flow sensors or temperature sensors. Further, if some of the IoT devices 1702 are not operational, other IoT devices 1702 in the fog 1720 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 18:
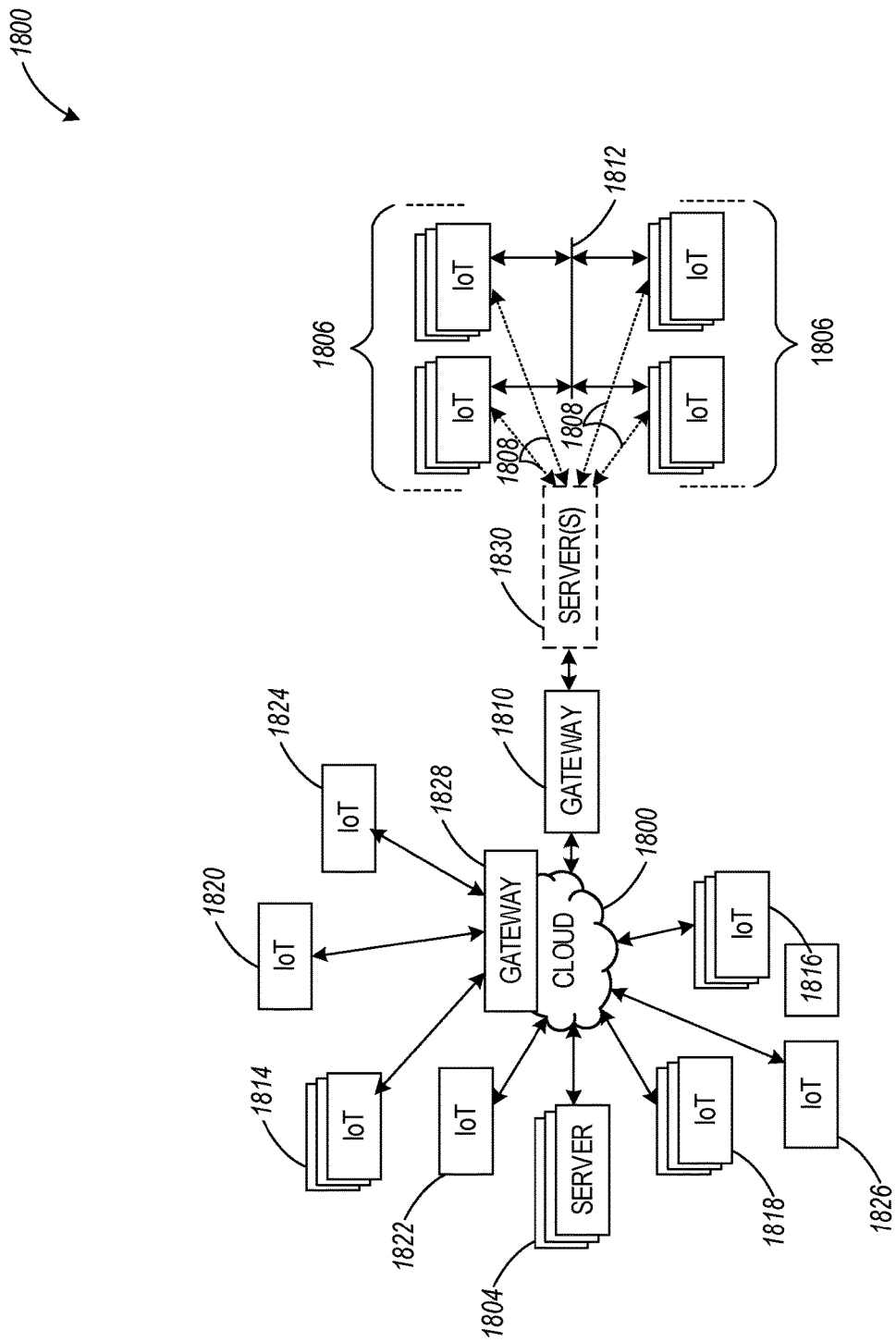
FIG. 18 illustrates a block diagram of a network illustrating communications among a number of IoT/endpoint devices, according to an example.

FIG. 18 illustrates a drawing of a cloud computing network, or cloud 1800, in communication with a number of IoT devices. The cloud computing network (or "cloud") 1800 may represent the Internet or may be a local area network (LAN), or a wide area network (WAN), such as a proprietary network for a company. The IoT devices may include any number of different types of devices, grouped in various combinations. For example, a traffic control group 1806 may include IoT devices along streets in a city. These IoT devices may include stoplights, traffic flow monitors, cameras, weather sensors, and the like. The traffic control group 1806, or other subgroups, may be in communication with the cloud 1800 through wired or wireless links 1808, such as LPWA links, optical links, and the like. Further, a wired or wireless sub-network 1812 may allow the IoT devices to communicate with each other, such as through a local area network, a wireless local area network, and the like. The IoT devices may use another device, such as a gateway 1810 or 1828 to communicate with remote locations such as the cloud 1800; the IoT devices may also use one or more servers 1830 to facilitate communication with the cloud 1800 or with the gateway 1810. For example, the one or more servers 1830 may operate as an intermediate network node to support a local edge cloud or fog implementation among a local area network. Further, the gateway 1828 that is depicted may operate in a cloud-to-gateway-to-many edge devices configuration, such as with the various IoT devices 1814, 1820, 1824 being constrained or dynamic to an assignment and use of resources in the cloud 1800.

Other example groups of IoT devices may include remote weather stations 1814, local information terminals 1816, alarm systems 1818, automated teller machines 1820, alarm panels 1822, or moving vehicles, such as emergency vehicles 1824 or other vehicles 1826, among many others. Each of these IoT devices may be in communication with other IoT devices, with servers 1804, with another IoT fog platform or system, or a combination therein. The groups of IoT devices may be deployed in various residential, commercial, and industrial settings (including in both private or public environments).

As may be seen from FIG. 18, a large number of IoT devices may be communicating through the cloud 1800. This may allow different IoT devices to request or provide information to other devices autonomously. For example, a group of IoT devices (e.g., the traffic control group 1806) may request a current weather forecast from a group of remote weather stations 1814, which may provide the forecast without human intervention. Further, an emergency vehicle 1824 may be alerted by an automated teller machine 1820 that a burglary is in progress. As the emergency vehicle 1824 proceeds towards the automated teller machine 1820, it may access the traffic control group 1806 to request clearance to the location, for example, by lights turning red to block cross traffic at an intersection in sufficient time for the emergency vehicle 1824 to have unimpeded access to the intersection.

Clusters of IoT devices, such as the remote weather stations 1814 or the traffic control group 1806, may be equipped to communicate with other IoT devices as well as with the cloud 1800. This may allow the IoT devices to form an ad-hoc network between the devices, allowing them to function as a single device, which may be termed a fog platform or system (e.g., as described above with reference to FIG. 17).

Figure 19:
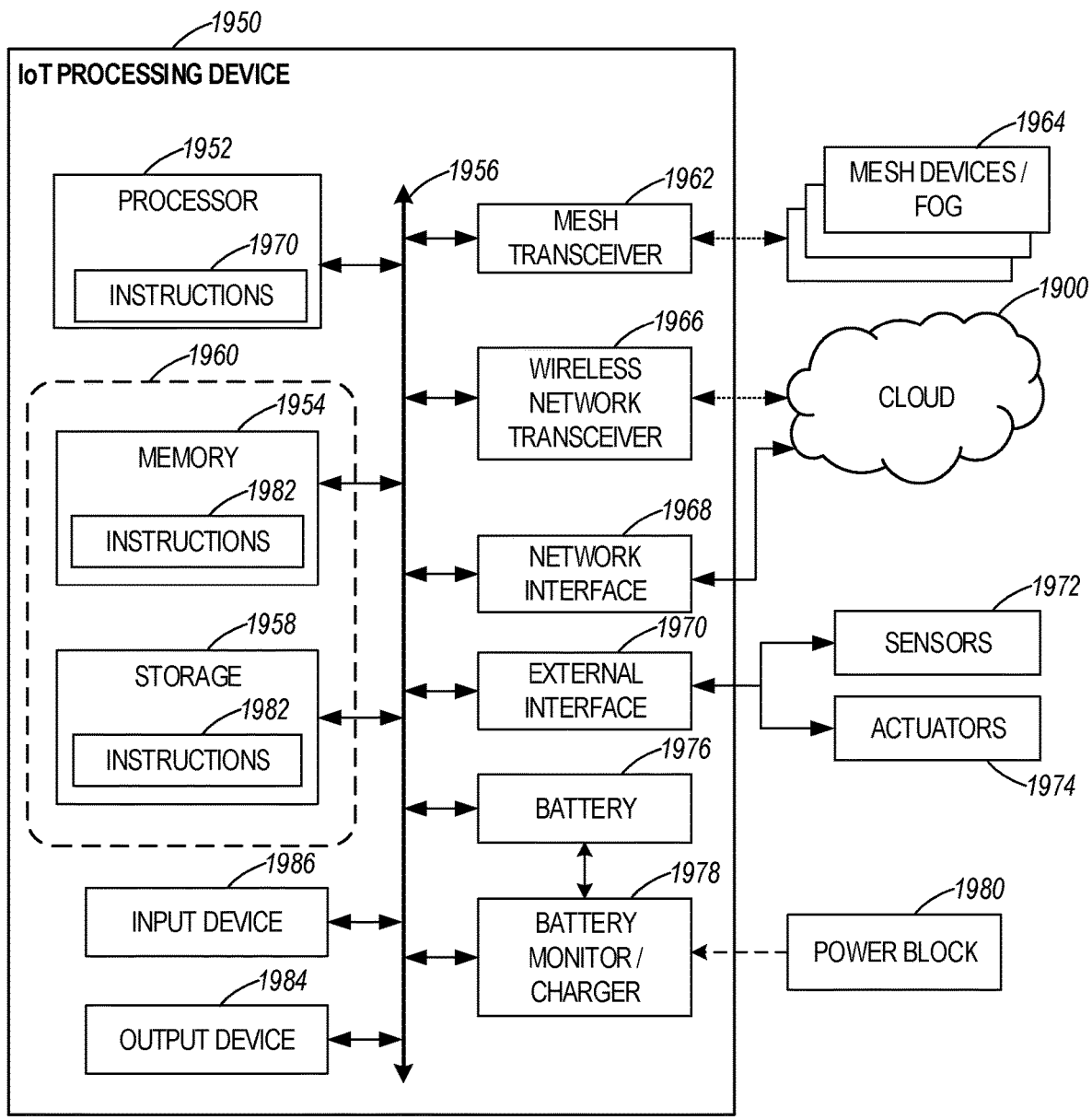
FIG. 19 illustrates a block diagram for an example IoT/endpoint device architecture upon which any one or more of the techniques (e.g., operations, processes, methods, and methodologies) discussed herein may be performed, according to an example.

FIG. 19 is a block diagram of an example of components that may be present in an IoT device 1950 for implementing the techniques described herein. The IoT device 1950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1950, or as components otherwise incorporated within a chassis of a larger system. Additionally, the block diagram of FIG. 19 is intended to depict a high-level view of components of the IoT device 1950. However, some of the components shown may be omitted, additional components may be present, and different arrangement of the components shown may occur in other implementations.

The IoT device 1950 may include processing circuitry in the form of a processor 1952, which may be a microprocessor, a multi-core processor, a multithreaded processor, an ultra-low voltage processor, an embedded processor, or other known processing elements. The processor 1952 may be a part of a system on a chip (SoC) in which the processor 1952 and other components are formed into a single integrated circuit, or a single package, such as the Edison™ or Galileo™ SoC boards from Intel. As an example, the processor 1952 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1952 may communicate with a system memory 1954 over an interconnect 1956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1958 may also couple to the processor 1952 via the interconnect 1956. In an example the storage 1958 may be implemented via a solid-state disk drive (SSDD). Other devices that may be used for the storage 1958 include flash memory cards, such as SD cards, microSD cards, XD picture cards, and the like, and USB flash drives. In low power implementations, the storage 1958 may be on-die memory or registers associated with the processor 1952. However, in some examples, the storage 1958 may be implemented using a micro hard disk drive (HDD). Further, any number of new technologies may be used for the storage 1958 in addition to, or instead of, the technologies described, such resistance change memories, phase change memories, holographic memories, or chemical memories, among others.

The components may communicate over the interconnect 1956. The interconnect 1956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1956 may be a proprietary bus, for example, used in a SoC based system. Other bus systems may be included, such as an I2C interface, an SPI interface, point to point interfaces, and a power bus, among others.

The interconnect 1956 may couple the processor 1952 to a mesh transceiver 1962, for communications with other mesh devices 1964. The mesh transceiver 1962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1962 may communicate using multiple standards or radios for communications at different range. For example, the IoT device 1950 may communicate with close devices, e.g., within about 10 meters, using a local transceiver based on BLE, or another low power radio, to save power. More distant mesh devices 1964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1966 may be included to communicate with devices or services in the cloud 1900 via local or wide area network protocols. The wireless network transceiver 1966 may be a LPWA transceiver that follows the IEEE 802.15.4, or IEEE 802.15.4g standards, among others. The IoT device 1950 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1962 and wireless network transceiver 1966, as described herein. For example, the radio transceivers 1962 and 1966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1962 and 1966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1968 may be included to provide a wired communication to the cloud 1900 or to other devices, such as the mesh devices 1964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1968 may be included to enable connect to a second network, for example, a NIC 1968 providing communications to the cloud over Ethernet, and a second NIC 1968 providing communications to other devices over another type of network.

Given the variety of types of applicable communications from the device to another component or network, applicable communications circuitry used by the device may include or be embodied by any one or more of components 1962, 1966, 1968, or 1970. Accordingly, in various examples, applicable means for communicating (e.g., receiving, transmitting, etc.) may be embodied by such communications circuitry.

The interconnect 1956 may couple the processor 1952 to an external interface 1970 that is used to connect external devices or subsystems. The external devices may include sensors 1972, such as accelerometers, level sensors, flow sensors, optical light sensors, camera sensors, temperature sensors, a global positioning system (GPS) sensors, pressure sensors, barometric pressure sensors, and the like. The external interface 1970 further may be used to connect the IoT device 1950 to actuators 1974, such as power switches, valve actuators, an audible sound generator, a visual warning device, and the like.

In some optional examples, various input/output (I/O) devices may be present within, or connected to, the IoT device 1950. For example, a display or other output device 1984 may be included to show information, such as sensor readings or actuator position. An input device 1986, such as a touch screen or keypad may be included to accept input. An output device 1984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1950.

A battery 1976 may power the IoT device 1950, although in examples in which the IoT device 1950 is mounted in a fixed location, it may have a power supply coupled to an electrical grid. The battery 1976 may be a lithium ion battery, or a metal-air battery, such as a zinc-air battery, an aluminum-air battery, a lithium-air battery, and the like.

A battery monitor/charger 1978 may be included in the IoT device 1950 to track the state of charge (SoCh) of the battery 1976. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1978 may communicate the information on the battery 1976 to the processor 1952 over the interconnect 1956. The battery monitor/charger 1978 may also include an analog-to-digital (ADC) convertor that enables the processor 1952 to directly monitor the voltage of the battery 1976 or the current flow from the battery 1976. The battery parameters may be used to determine actions that the IoT device 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the IoT device 1950. A wireless battery charging circuit, such as an LTC4020 chip from Linear Technologies of Milpitas, Calif., among others, may be included in the battery monitor/charger 1978. The specific charging circuits may be selected based on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1958 may include instructions 1982 in the form of software, firmware, or hardware commands to implement the techniques described herein. Although such instructions 1982 are shown as code blocks included in the memory 1954 and the storage 1958, it may be understood that any of the code blocks may be replaced with hardwired circuits, for example, built into an application specific integrated circuit (ASIC).

In an example, the instructions 1982 provided via the memory 1954, the storage 1958, or the processor 1952 may be embodied as a non-transitory, machine readable medium 1960 including code to direct the processor 1952 to perform electronic operations in the IoT device 1950. The processor 1952 may access the non-transitory, machine readable medium 1960 over the interconnect 1956. For instance, the non-transitory, machine-readable medium 1960 may be embodied by devices described for the storage 1958 or may include specific storage units such as optical disks, flash drives, or any number of other hardware devices. The non-transitory, machine-readable medium 1960 may include instructions to direct the processor 1952 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own or may be combined in any permutation or combination with any one or more of the other examples provided below or throughout the present disclosure.

Example 1 is a device, comprising: communications circuitry to communicate with a first access network; processing circuitry; and a memory device including instructions embodied thereon, wherein the instructions, which when executed by the processing circuitry, configure the processing circuitry to perform operations to: transmit an authorization request for a vehicle-to-everything (V2X) communication to a V2X application function within a service coordinating entity, the request transmitted from the device via the first access network; receive V2X configuration parameters from the service coordinating entity, via the first access network, wherein the V2X configuration parameters are received in response to the authorization request and based on V2X subscription information received by the V2X application function via a V2X application programming interface (API) within the service coordinating entity; and establish a V2X communication link for the V2X communication with a second device based on the V2X configuration parameters, the second device associated with a second access network.

In Example 2, the subject matter of Example 1 includes, wherein the V2X communication link is a communication link using a PC5 interface, and the V2X configuration parameters comprise PC5 configuration parameters for the PC5 interface.

In Example 3, the subject matter of Examples 1-2 includes, wherein the service coordinating entity is a Multi-Access Edge Computing (MEC) entity, and the V2X API is a MEC V2X API within a MEC platform of the MEC entity.

In Example 4, the subject matter of Examples 1-3 includes, the operations further to: receive the V2X communication parameters subsequent to a verification the device is authorized to perform the V2X communication, the verification based on a device subscription information received by the V2X application function via the V2X API.

In Example 5, the subject matter of Examples 1-4 includes, wherein the V2X configuration parameters comprise PC5 configuration parameters that are common to the first access network and the second access network.

In Example 6, the subject matter of Examples 1-5 includes, the operations further to: decode radio resource control (RRC) signaling or network access stratum (NAS) signaling including a network address of the service coordinating entity; and transmit the authorization request using the network address.

In Example 7, the subject matter of Examples 1-6 includes, wherein the device is included in a first vehicle moving within an operational area of the first access network, and the second device is included in a second vehicle moving within an operational area of the second access network.

In Example 8, the subject matter of Examples 1-7 includes, wherein the device is a mobile computing device, and wherein the service coordinating entity is a Multi-Access Edge Computing (MEC) host running a MEC application providing the V2X application function.

In Example 9, the subject matter of Examples 1-8 includes, wherein the first and second access networks are 5G wireless networks operating according to a 3GPP standards family.

Example 10 is a device of a service coordinating entity, comprising: communications circuitry to communicate with a first access network; processing circuitry; and a memory device including instructions embodied thereon, wherein the instructions, which when executed by the processing circuitry, configure the processing circuitry to perform operations to: receive by a vehicle-to-everything (V2X) application function of the service coordinating entity, an authorization request for a V2X communication, the authorization request received from a mobile computing device via the first access network; receive by the V2X application function and via a V2X application programming interface (API) between the service coordinating entity and the first access network, device subscription information indicating devices authorized to perform the V2X communication within the first access network; perform authorization of the mobile computing device for the V2X communication based on the device subscription information; and based on the performed authorization, encode for transmission to the mobile computing device, V2X configuration parameters for establishing a V2X communication link of the V2X communication.

In Example 11, the subject matter of Example 10 includes, wherein the V2X application function is a mobile edge application running on a virtual machine within the service coordinating entity.

In Example 12, the subject matter of Examples 10-11 includes, wherein the service coordinating entity is a Multi-Access Edge Computing (MEC) host running a MEC application providing the V2X application function, and the V2X API is a MEC V2X API within a MEC platform of the MEC host.

In Example 13, the subject matter of Examples 10-12 includes, the operations further to: receive the authorization request via an Mp1 interface between the V2X API and the V2X application function.

In Example 14, the subject matter of Examples 10-13 includes, wherein the first access network is an Evolved Packet Core (EPC) network, and the operations further to: receive the device subscription information from a Service Capability Exposure Function (SCEF) of the EPC network.

In Example 15, the subject matter of Examples 10-14 includes, wherein the first access network is a Fifth Generation (5G) network, and the operations further to: receive the device subscription information from a Network Exposure Function (NEF) of the 5G network.

In Example 16, the subject matter of Examples 10-15 includes, wherein the V2X communication link is a communication link using a PC5 interface, and the V2X configuration parameters comprise PC5 configuration parameters for the PC5 interface.

In Example 17, the subject matter of Examples 10-16 includes, the operations further to: receive an indication that the mobile computing device is within a service area of a second access network, the service area being outside the first access network; and communicate the V2X configuration parameters via the V2X API to a second service coordinating entity for forwarding to the mobile computing device via the second access network; wherein the second service coordinating entity comprises a second V2X API coupled to the second access network.

In Example 18, the subject matter of Example 17 includes, wherein the V2X configuration parameters are forwarded to the mobile computing device via an SGi interface of the second access network.

In Example 19, the subject matter of Examples 17-18 includes, the operations further to: communicate the V2X configuration parameters to the second service coordinating entity via an Mp3 interface.

In Example 20, the subject matter of Examples 17-19 includes, wherein the first access network is a first public land mobile network (PLMN) of a first service provider, the second access network is a second PLMN of a second service provider, and the operations further to: receive via the second V2X API of the second service coordinating entity, V2X configuration parameters associated with the second PLMN; and forward the V2X configuration parameters associated with the second PLMN to a second mobile computing device that is within the first access network, the forwarded V2X communication parameters for establishing a V2X communication link between the second mobile computing device and at least another device associated with the second PLMN.

In Example 21, the subject matter of Example 20 includes, the operations further to: generate a set of V2X configuration parameters that is common to the first PLMN and the second PLMN, based on the received V2X configuration parameters associated with the second PLMN; and encode for transmission to the mobile computing device, the common set of V2X configuration parameters for establishing the V2X communication link of the V2X communication.

In Example 22, the subject matter of Examples 20-21 includes, the operations further to: encode for transmission to a service management entity, the V2X configurations parameters associated with the first PLMN; decode a common set of V2X configuration parameters from the service management entity, the common set of V2X parameters being common to the first PLMN and the second PLMN and based on the V2X configurations parameters associated with the first PLMN and the V2X configuration parameters associated with the second PLMN; and encode for transmission to the mobile computing device, the common set of V2X configuration parameters for establishing the V2X communication link of the V2X communication.

Example 23 is a method, performed by a mobile computing device connected to an access network, the method comprising: transmitting an authorization request for a vehicle-to-everything (V2X) communication to a V2X application function within a service coordinating entity, the request transmitted via the first access network; receiving V2X configuration parameters from the service coordinating entity, via the first access network, wherein the V2X configuration parameters are received in response to the authorization request and based on V2X subscription information received by the V2X application function via a V2X application programming interface (API) within the service coordinating entity; and establishing a V2X communication link for the V2X communication with a second device based on the V2X configuration parameters, the second device associated with a second access network.

In Example 24, the subject matter of Example 23 includes, decoding radio resource control (RRC) signaling or network access stratum (NAS) signaling including a network address of the service coordinating entity; and transmitting the authorization request using the network address.

In Example 25, the subject matter of Examples 23-24 includes, wherein the V2X communication link is a communication link using a PC5 interface, and the V2X configuration parameters comprise PC5 configuration parameters for the PC5 interface.

In Example 26, the subject matter of Examples 23-25 includes, wherein the service coordinating entity is a Multi-Access Edge Computing (MEC) entity, and the V2X API is a MEC V2X API within a MEC platform of the MEC entity.

In Example 27, the subject matter of Examples 23-26 includes, receiving the V2X communication parameters subsequent to a verification the device is authorized to perform the V2X communication, the verification based on a device subscription information received by the V2X application function via the V2X API.

In Example 28, the subject matter of Examples 23-27 includes, wherein the V2X configuration parameters comprise PC5 configuration parameters that are common to the first access network and the second access network.

In Example 29, the subject matter of Examples 23-28 includes, wherein the device is included in a first vehicle moving within an operational area of the first access network, and the second device is included in a second vehicle moving within an operational area of the second access network.

In Example 30, the subject matter of Examples 23-29 includes, wherein the device is a mobile computing device, and wherein the service coordinating entity is a Multi-Access Edge Computing (MEC) host running a MEC application providing the V2X application function.

In Example 31, the subject matter of Examples 23-30 includes, wherein the first and second access networks are 5G wireless networks operating according to a 3GPP standards family.

Example 32 is at least one machine-readable storage medium including instructions, wherein the instructions, when executed by a processing circuitry of a computing device, cause the processing circuitry to perform operations of any of Examples 23 to 31.

Example 33 is an apparatus comprising means for performing any of the methods of Examples 23 to 31.

Example 34 is a method, performed by a service coordinating entity connected to an access network, the method comprising: receiving by a vehicle-to-everything (V2X) application function of the service coordinating entity, an authorization request for a V2X communication, the authorization request received from a mobile computing device via the first access network; receiving by the V2X application function and via a V2X application programming interface (API) between the service coordinating entity and the first access network, device subscription information indicating devices authorized to perform the V2X communication within the first access network; performing authorization of the mobile computing device for the V2X communication based on the device subscription information; and based on the performed authorization, encoding for transmission to the mobile computing device, V2X configuration parameters for establishing a V2X communication link of the V2X communication.

In Example 35, the subject matter of Example 34 includes, wherein the V2X application function is a mobile edge application running on a virtual machine within the service coordinating entity.

In Example 36, the subject matter of Examples 34-35 includes, wherein the service coordinating entity is a Multi-Access Edge Computing (MEC) host running a MEC application providing the V2X application function, and the V2X API is a MEC V2X API within a MEC platform of the MEC host.

In Example 37, the subject matter of Examples 34-36 includes, receiving the authorization request via an Mp1 interface between the V2X API and the V2X application function.

In Example 38, the subject matter of Examples 34-37 includes, wherein the first access network is an Evolved Packet Core (EPC) network, and the method further comprises: receiving the device subscription information from a Service Capability Exposure Function (SCEF) of the EPC network.

In Example 39, the subject matter of Examples 34-38 includes, wherein the first access network is a Fifth Generation (5G) network, and the method further comprises: receiving the device subscription information from a Network Exposure Function (NEF) of the 5G network.

In Example 40, the subject matter of Examples 34-39 includes, wherein the V2X communication link is a communication link using a PC5 interface, and the V2X configuration parameters comprise PC5 configuration parameters for the PC5 interface.

In Example 41, the subject matter of Examples 34-40 includes, receiving an indication that the mobile computing device is within a service area of a second access network, the service area being outside the first access network; and communicating the V2X configuration parameters via the V2X API to a second service coordinating entity for forwarding to the mobile computing device via the second access network; wherein the second service coordinating entity comprises a second V2X API coupled to the second access network.

In Example 42, the subject matter of Example 41 includes, wherein the V2X configuration parameters are forwarded to the mobile computing device via an SGi interface of the second access network.

In Example 43, the subject matter of Examples 41-42 includes, communicating the V2X configuration parameters to the second service coordinating entity via an Mp3 interface.

In Example 44, the subject matter of Examples 41-43 includes, wherein the first access network is a first public land mobile network (PLMN) of a first service provider, the second access network is a second PLMN of a second service provider, and the method further comprises: receiving via the second V2X API of the second service coordinating entity, V2X configuration parameters associated with the second PLMN; and forwarding the V2X configuration parameters associated with the second PLMN to a second mobile computing device that is within the first access network, the forwarded V2X communication parameters for establishing a V2X communication link between the second mobile computing device and at least another device associated with the second PLMN.

In Example 45, the subject matter of Example 44 includes, generating a set of V2X configuration parameters that is common to the first PLMN and the second PLMN, based on the received V2X configuration parameters associated with the second PLMN; and encoding for transmission to the mobile computing device, the common set of V2X configuration parameters for establishing the V2X communication link of the V2X communication.

In Example 46, the subject matter of Examples 44-45 includes, encoding for transmission to a service management entity, the V2X configurations parameters associated with the first PLMN; decoding a common set of V2X configuration parameters from the service management entity, the common set of V2X parameters being common to the first PLMN and the second PLMN and based on the V2X configurations parameters associated with the first PLMN and the V2X configuration parameters associated with the second PLMN; and encoding for transmission to the mobile computing device, the common set of V2X configuration parameters for establishing the V2X communication link of the V2X communication.

Example 47 is at least one machine-readable storage medium including instructions, wherein the instructions, when executed by a processing circuitry of a computing device, cause the processing circuitry to perform operations of any of Examples 34 to 46.

Example 48 is an apparatus comprising means for performing any of the methods of Examples 34 to 46.

Example 49 is a system, comprising: a user equipment (UE) device, comprising communications circuitry to communicate via an access network, and processing circuitry configured to: transmit an authorization request for a vehicle-to-everything (V2X) communication, the request transmitted via the access network; receive V2X configuration parameters for the V2X communication via the access network, in response to the authorization request; and a Multi-Access Edge Computing (MEC) entity, comprising communications circuitry to communicate via the access network, and processing circuitry configured to: receive via the access network, the authorization request by a V2X application function of the MEC entity; receive by the V2X application function and via a V2X application programming interface (API) between the MEC entity and the access network, device subscription information indicating devices authorized to perform the V2X communication within the access network; and transmit the V2X communication parameters via the access network, based on the device subscription information.

In Example 50, the subject matter of Example 49 includes, wherein the processing circuitry of the MEC entity is further configured to: perform authorization of the UE for the V2X communication based on the device subscription information; and based on the performed authorization, encode the V2X configuration parameters for transmission to the UE for establishing a V2X communication link of the V2X communication.

In Example 51, the subject matter of Examples 49-50 includes, wherein the processing circuitry of the UE is further configured to: decode radio resource control (RRC) signaling or network access stratum (NAS) signaling including a network address of the MEC entity; and transmit the authorization request using the network address.

In Example 52, the subject matter of Examples 49-51 includes, a second MEC entity, the second MEC entity comprising communications circuitry to communicate via a second access network, and processing circuitry, wherein the processing circuitry of the MEC entity and the processing circuitry of the second MEC entity are configured to: exchange V2X communication parameters associated with the access network and the second access network; and generate a common set of V2X communication parameters for use by UEs within the access network and the second access network, based on the exchanged V2X communication parameters.

In Example 53, the subject matter of Example 52 includes, wherein the processing circuitry of the MEC entity and the processing circuitry of the second MEC entity exchange the V2X communication parameters via a wireless interface.

In Example 54, the subject matter of Example 53 includes, wherein the wireless interface is an Mp3 interface.

In Example 55, the subject matter of Examples 52-54 includes, wherein the processing circuitry of the UE device is configured to: establish a V2X communication link for the V2X communication with a second UE device based on the common set of V2X configuration parameters, the second UE associated with the second access network.

In Example 56, the subject matter of Example 55 includes, wherein the V2X communication link is a communication link using a PC5 interface, and the common set of V2X configuration parameters comprise PC5 configuration parameters for the PC5 interface.

In Example 57, the subject matter of Examples 52-56 includes, wherein the processing circuitry of the MEC entity is further to: receive an indication that the UE is within a service area of the second access network, the service area being outside the access network; and communicate the common set of V2X configuration parameters via the V2X API to the second MEC entity for forwarding to the UE via the second access network; wherein the second MEC entity comprises a second V2X API coupled to the second access network.

In Example 58, the subject matter of Example 57 includes, wherein the common set of V2X configuration parameters are forwarded to the UE via an SGi interface of the second access network.

In Example 59, the subject matter of Examples 57-58 includes, wherein the access network is a first public land mobile network (PLMN) of a first service provider, the second access network is a second PLMN of a second service provider.

In Example 60, the subject matter of Examples 49-59 includes, a second MEC entity, the second MEC entity comprising communications circuitry to communicate via a second access network, and processing circuitry; and a third MEC entity, the third MEC entity comprising communications circuitry to communicate with the first and second MEC entities, and a processing circuitry, wherein the processing circuitry of the third MEC entity is configured to: receive from the MEC entity, the V2X communication parameters associated with the access network; receive from the second MEC entity, V2X communication parameters associated with the second access network; and generate a common set of V2X communication parameters for configuring one or more V2X communication links within the access network and the second access network.

In Example 61, the subject matter of Example 60 includes, wherein the MEC entity and the second MEC entity are MEC hosts coupled via an Mp3 interface, and wherein the third MEC entity is an operator-neutral server.

In Example 62, the subject matter of Examples 60-61 includes, wherein the processing circuitry of the third MEC entity is configured to: communicate the common set of V2X communication parameters to the MEC entity via the V2X API; and communicate the common set of V2X communication parameters to the second MEC entity via a second V2X API within a MEC platform of the second MEC entity.

In Example 63, the subject matter of Example 62 includes, wherein the V2X application function is running as a first MEC application within the MEC entity, and wherein the processing circuitry of the MEC entity is configured to: forward the common set of V2X communication parameters to at least a second MEC application within the MEC entity via the V2X API.

In Example 64, the subject matter of Examples 49-63 includes, wherein the access network is an Evolved Packet Core (EPC) network, and the processing circuitry of the MEC entity is configured to: receive the device subscription information from a Service Capability Exposure Function (SCEF) of the EPC network.

In Example 65, the subject matter of Examples 49-64 includes, wherein the access network is a Fifth Generation (5G) network, and the processing circuitry of the MEC entity is configured to: receive the device subscription information from a Network Exposure Function (NEF) of the 5G network.

Example 66 is at least one non-transitory machine-readable storage medium including instructions, wherein the instructions, when executed by a processing circuitry of a computing device, cause the processing circuitry to perform operations comprising: transmitting an authorization request for a vehicle-to-everything (V2X) communication to a V2X application function within a service coordinating entity, the request transmitted via a first access network; receiving V2X configuration parameters from the service coordinating entity, via the first access network, wherein the V2X configuration parameters are received in response to the authorization request and based on V2X subscription information received by the V2X application function via a V2X application programming interface (API) within the service coordinating entity; and establishing a V2X communication link for the V2X communication with a second device based on the V2X configuration parameters, the second device associated with a second access network.

In Example 67, the subject matter of Example 66 includes, wherein the instructions further cause the processing circuitry to perform operations comprising: decoding radio resource control (RRC) signaling or network access stratum (NAS) signaling including a network address of the service coordinating entity; and transmitting the authorization request using the network address.

Example 68 is at least one machine-readable medium including instructions that, when executed by processing circuitry, cause the processing circuitry to perform operations to implement of any of Examples 1-67.

Example 69 is a method to implement of any of Examples 1-67.

Example 70 is a network comprising respective devices and device communication mediums for performing any of the operations of Examples 1 to 67.

Example 71 is an 4G/5G communications network topology, the network topology comprising respective communication links adapted to perform communications for the operations of any of Examples 1 to 67.

Example 72 is an edge cloud computing device implementation comprising processing nodes and computing units adapted for performing any of the operations of Examples 1 to 67.

Example 73 is an ETSI MEC system implementation comprising devices, processing nodes, and computing units adapted for performing any of the operations of Examples 1 to 67.

Example 74 is an edge cloud network platform comprising physical and logical computing resources adapted for performing any of the operations of Examples 1 to 67.

Example 75 is an apparatus comprising means for performing any of the operations of Examples 1 to 67.

Example 76 is a system to perform the operations of any of Examples 1 to 67.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. A device, comprising:
communications circuitry to communicate with a first access network associated with a first access point;
processing circuitry; and
a memory device including instructions embodied thereon, wherein the instructions, which when executed by the processing circuitry, configure the processing circuitry to perform operations to:
transmit an authorization request for a vehicle-to-everything (V2X) communication to a V2X application function within a service coordinating entity of the first access network, the request transmitted from the device via the first access network and the service coordinating entity of the first access network being separate from the first access point;
receive a common set of V2X configuration parameters from the service coordinating entity, via the first access network, wherein the common set of V2X configuration parameters are received in response to the authorization request and are based on V2X subscription information associated with the device and received by the V2X application function via a V2X application programming interface (API) within the service coordinating entity, the common set of V2X configuration parameters including a common set of configuration parameters that are common to the first access network and a second access network, the common set of V2X configuration parameters negotiated between the service coordinating entity in the first access network and a service coordinating entity in the second access network prior to transmission of the authorization request; and
establish a V2X communication link for the V2X communication with a second device based on the common set of V2X configuration parameters including the common set, the second device associated with the second access network.

2. The device of claim 1, wherein the V2X communication link is a communication link using a PC5 interface, and the V2X configuration parameters comprise PC5 configuration parameters for the PC5 interface.

3. The device of claim 1, wherein the service coordinating entity of the first access network is a Multi-Access Edge Computing (MEC) entity, and the V2X API is a MEC V2X API within a MEC platform of the MEC entity.

4. The device of claim 1, the operations further to:
receive the V2X configuration parameters subsequent to a verification the device is authorized to perform the V2X communication, the verification based on the V2X subscription information received by the V2X application function via the V2X API.

5. The device of claim 1, wherein the configuration parameters that are common to the first access network and the second access network include PC5 configuration parameters, wherein the second access network is associated with a second access point, wherein the first access point and the second access point are associated with respective separate public land mobile networks (PLMNs).

6. The device of claim 1, the operations further to:
decode radio resource control (RRC) signaling or network access stratum (NAS) signaling including a network address of the service coordinating entity of the first access network; and
transmit the authorization request using the network address.

7. The device of claim 1, wherein the device is included in a first vehicle moving within an operational area of the first access network, and the second device is included in a second vehicle moving within an operational area of the second access network.

8. The device of claim 1, wherein the device is a mobile computing device, and wherein the service coordinating entity is a Multi-Access Edge Computing (MEC) host running a MEC application providing the V2X application function.

9. The device of claim 1, wherein the first and second access networks are 5G wireless networks operating according to a 3GPP standards family.

10. A device of a service coordinating entity, comprising:
communications circuitry to communicate with a first access network associated with a first access point, the first access point being separate from the service coordinating entity;
processing circuitry; and
a memory device including instructions embodied thereon, wherein the instructions, which when executed by the processing circuitry, configure the processing circuitry to perform operations to:
receive by a vehicle-to-everything (V2X) application function of the service coordinating entity, an authorization request for a V2X communication, the authorization request received from a mobile computing device via the first access point of the first access network;
receive by the V2X application function and via a V2X application programming interface (API) between the service coordinating entity and the first access network, device subscription information indicating devices authorized to perform the V2X communication within the first access network;
perform authorization of the mobile computing device for the V2X communication based on the device subscription information; and
based on the performed authorization, encode for transmission to the mobile computing device, a common set of V2X configuration parameters for establishing a V2X communication link of the V2X communication between the first access network and a second access network, the a common set of V2X configuration parameters including a common set of configuration parameters that are common to the first access network and the second access network, the common set of V2X configuration parameters negotiated between the service coordinating entity in the first access network and a service coordinating entity in the second access network prior to receiving the authorization request.

11. The device of claim 10, wherein the V2X application function is a mobile edge application running on a virtual machine within the service coordinating entity.

12. The device of claim 10, wherein the service coordinating entity in the first access network is a Multi-Access Edge Computing (MEC) host running a MEC application providing the V2X application function, and the V2X API is a MEC V2X API within a MEC platform of the MEC host.

13. The device of claim 10, wherein the second access network is associated with a second access point, wherein the first access point and the second access point are associated with respective separate public land mobile networks (PLMNs), and the operations further to:
receive the authorization request via an Mp1 interface between the V2X API and the V2X application function.

14. A method, performed by a service coordinating entity connected to a first access network, the method comprising:
receiving by a vehicle-to-everything (V2X) application function of the service coordinating entity, an authorization request for a V2X communication, the authorization request received from a mobile computing device via a first access point of the first access network;
receiving by the V2X application function and via a V2X application programming interface (API) between the service coordinating entity and the first access network, device subscription information indicating devices authorized to perform the V2X communication within the first access network;
performing authorization of the mobile computing device for the V2X communication based on the device subscription information; and
based on the performed authorization, encoding for transmission to the mobile computing device, a common set of V2X configuration parameters for establishing a V2X communication link of the V2X communication between the first access network and a second access network, the a common set of V2X configuration parameters including a common set of configuration parameters that are common to the first access network and the second access network, the common set of V2X configuration parameters negotiated between the service coordinating entity in the first access network and a service coordinating entity in the second access network prior to receiving the authorization request.

15. The method of claim 14, wherein the V2X application function is a mobile edge application running on a virtual machine within the service coordinating entity.

16. The method of claim 14, wherein the service coordinating entity of the first access network is a Multi-Access Edge Computing (MEC) host running a MEC application providing the V2X application function, wherein the V2X API is a MEC V2X API within a MEC platform of the MEC host, wherein the second access network is associated with a second access point, and wherein the first access point and the second access point are associated with respective separate public land mobile networks (PLMNs).

17. The method of claim 14, further comprising:
receiving the authorization request via an Mp1 interface between the V2X API and the V2X application function.

18. The method of claim 14, wherein the first access network is an Evolved Packet Core (EPC) network, and the method further comprises:
receiving the device subscription information from a Service Capability Exposure Function (SCEF) of the EPC network.

19. The method of claim 14, wherein the first access network is a Fifth Generation (5G) network, and the method further comprises:
receiving the device subscription information from a Network Exposure Function (NEF) of the 5G network via the first access point.

20. The method of claim 14, wherein the V2X communication link is a communication link using a PC5 interface, and the V2X configuration parameters comprise PC5 configuration parameters for the PC5 interface.

21. The method of claim 14, further comprising:
receiving an indication that the mobile computing device is within a service area of a second access network, the service area being outside the first access network; and
communicating the V2X configuration parameters via the V2X API to a second service coordinating entity for forwarding to the mobile computing device via the second access network;
wherein the second service coordinating entity comprises a second V2X API coupled to the second access network.

22. The method of claim 21, wherein the V2X configuration parameters are forwarded to the mobile computing device via an SGi interface of the second access network.

23. The method of claim 21, further comprising:
communicating the V2X configuration parameters to the second service coordinating entity via an Mp3 interface.

24. At least one non-transitory machine-readable storage medium including instructions, wherein the instructions, when executed by a processing circuitry of a computing device, cause the processing circuitry to perform operations comprising:
transmitting an authorization request for a vehicle-to-everything (V2X) communication to a V2X application function within a service coordinating entity of a first access network, the request transmitted via a first access point of the first access network, the first access point being separate from the service coordinating entity;
receiving a common set of V2X configuration parameters from the service coordinating entity, via the first access network, wherein the a common set of V2X configuration parameters are received in response to the authorization request and are based on V2X subscription information associated with the computing device and received by the V2X application function via a V2X application programming interface (API) within the service coordinating entity, the a common set of V2X configuration parameters including a common set of configuration parameters that are common to the first access network and a second access network, the common set of V2X configuration parameters negotiated between the service coordinating entity in the first access network and a service coordinating entity in the second access network prior to transmission of the authorization request; and
establishing a V2X communication link for the V2X communication with a second device based on the common set of V2X configuration parameters including the common set, the second device associated with the second access network.

25. The least one non-transitory machine-readable storage medium of claim 24, wherein the second access network is associated with a second access point, wherein the first access point and the second access point are associated with respective separate public land mobile networks (PLMNs), and wherein the instructions further cause the processing circuitry to perform operations comprising:
decoding radio resource control (RRC) signaling or network access stratum (NAS) signaling including a network address of the service coordinating entity; and
transmitting the authorization request using the network address.

* * * * *